US006972855B2

(12) United States Patent
Kashiwagi

(10) Patent No.: US 6,972,855 B2
(45) Date of Patent: Dec. 6, 2005

(54) IMAGE FORMING APPARATUS AND IMAGE FORMING METHOD

(75) Inventor: Masaki Kashiwagi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 925 days.

(21) Appl. No.: 09/879,008

(22) Filed: Jun. 13, 2001

(65) Prior Publication Data

US 2002/0015160 A1     Feb. 7, 2002

(30) Foreign Application Priority Data

Jun. 14, 2000    (JP) .............................. 2000-178701

(51) Int. Cl.[7] ............................................. G06F 15/00
(52) U.S. Cl. ................... 358/1.1; 358/1.2; 358/451; 715/515; 715/530
(58) Field of Search ....................... 358/1.1, 1.2, 451; 715/515, 530

(56) References Cited

U.S. PATENT DOCUMENTS 5,859,711 A * 1/1999 Barry et al. ................ 358/296
5,987,226 A * 11/1999 Ishikawa et al. ............ 358/1.13
6,026,416 A * 2/2000 Kanerva et al. ............. 715/515

* cited by examiner

Primary Examiner—Edward Coles
Assistant Examiner—Mark R. Milia
(74) Attorney, Agent, or Firm—Fitzpatrick, Cella, Harper & Scinto

(57) ABSTRACT

A control method for an image forming apparatus for executing various jobs transmitted from an information processing apparatus includes analyzing a process transmitted from the information processing apparatus and generating a job according to the analysis. Each of information constituting a job, information constituting a binder, and information constituting a document, is managed. The generated job is divided into a smaller document unit to generate a document which is processed, the document is divided into a smaller page unit to generate a page, which is processed, and the page is divided into a smaller band unit to generated a band, which is processed. Requests are arbitrated for using a device from the document generation, document processing, page processing, and band processing. At least one of the document, page, and band processing is done according to formats of input and output data.

19 Claims, 31 Drawing Sheets

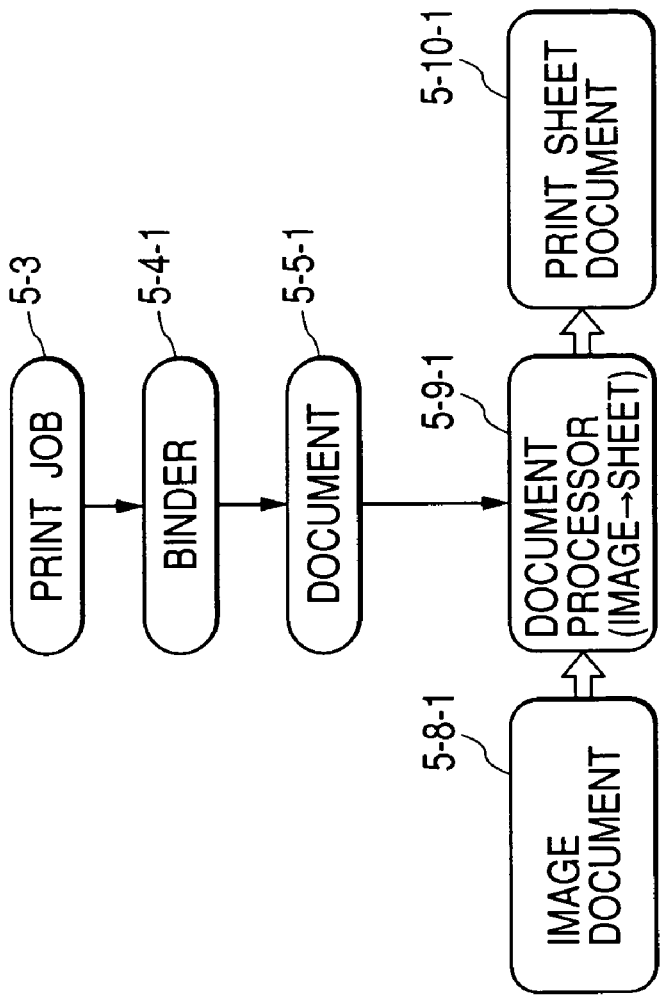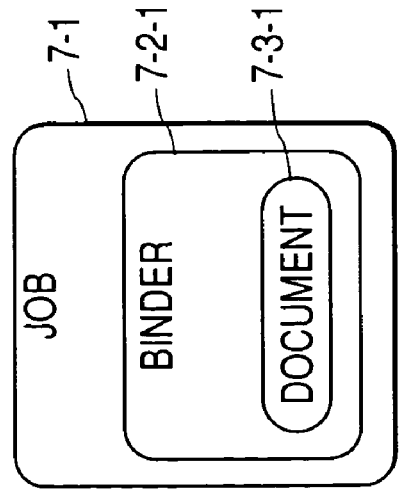

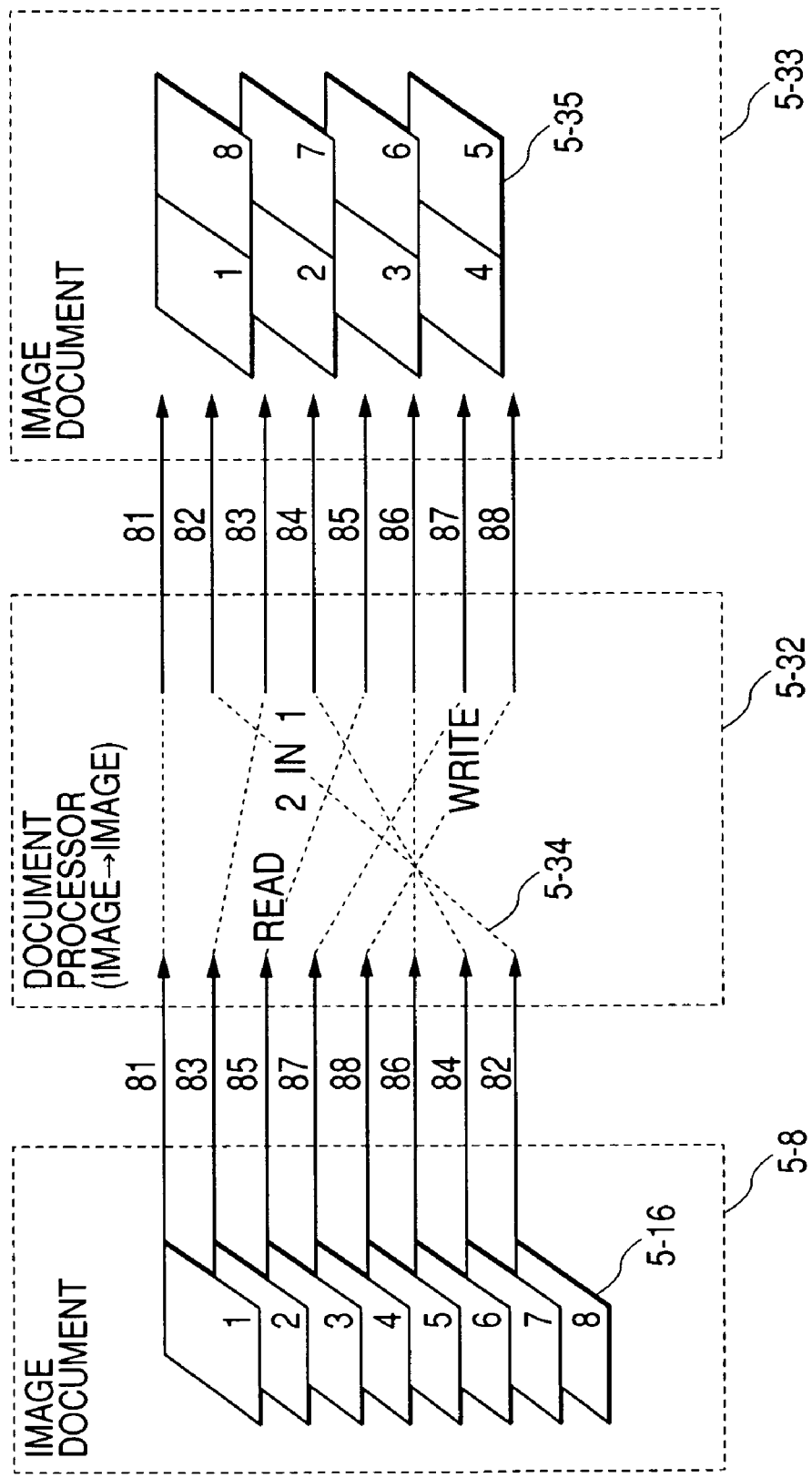

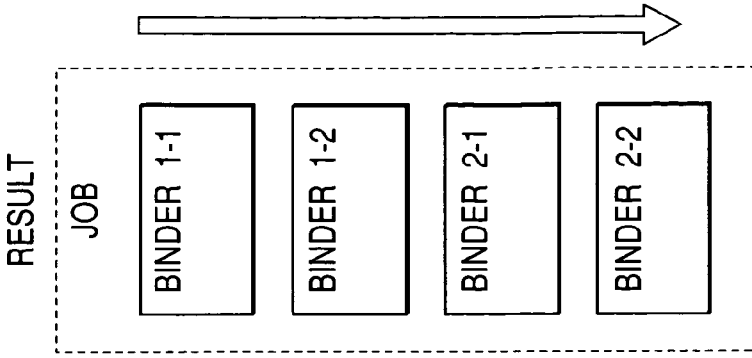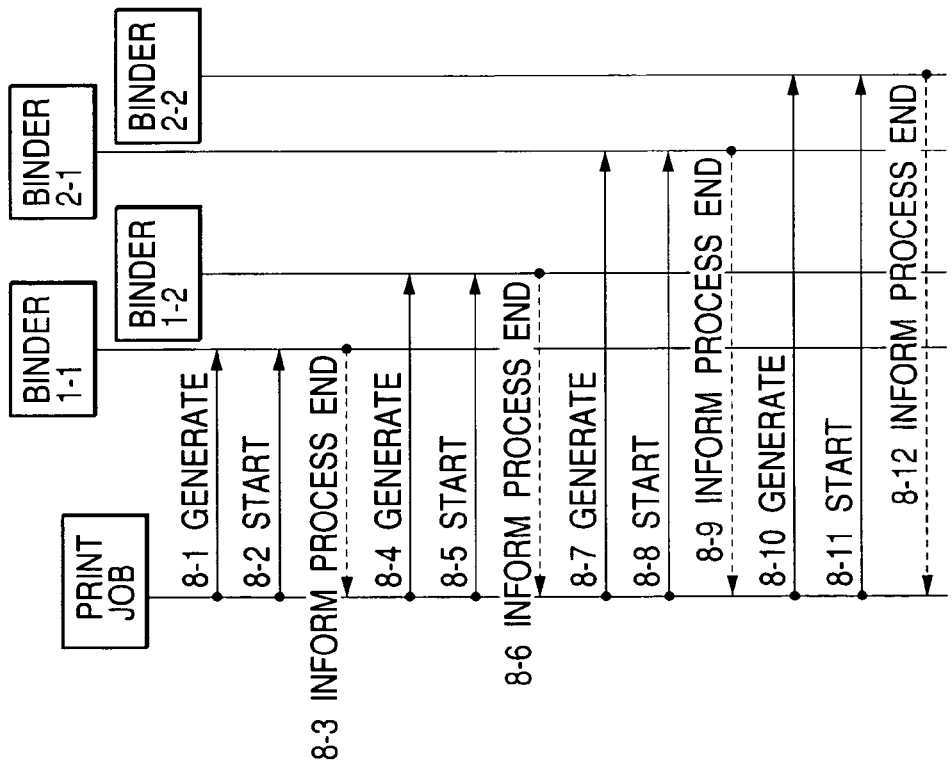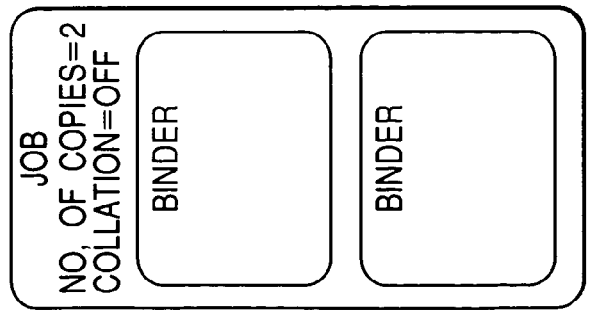

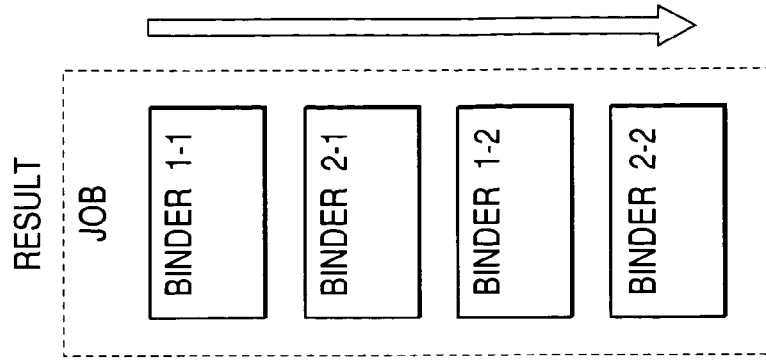
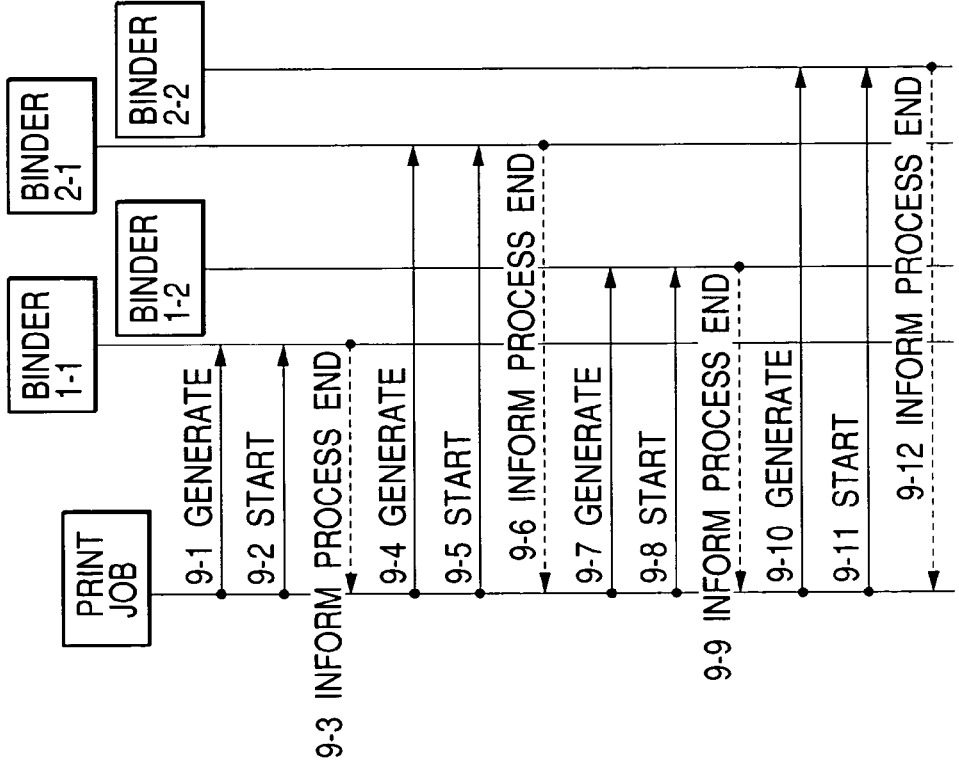
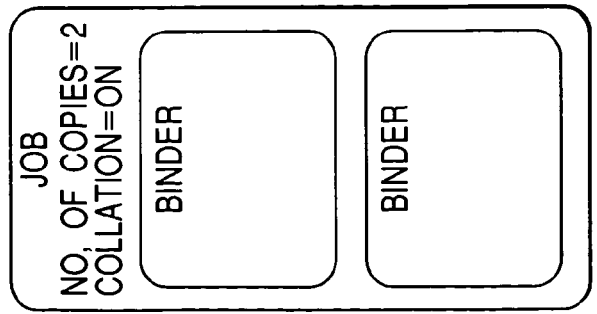

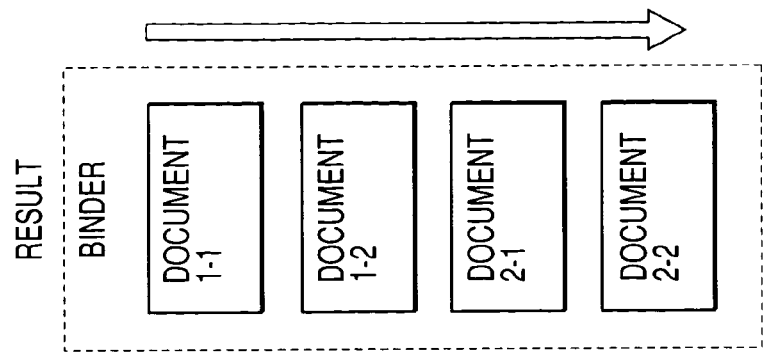
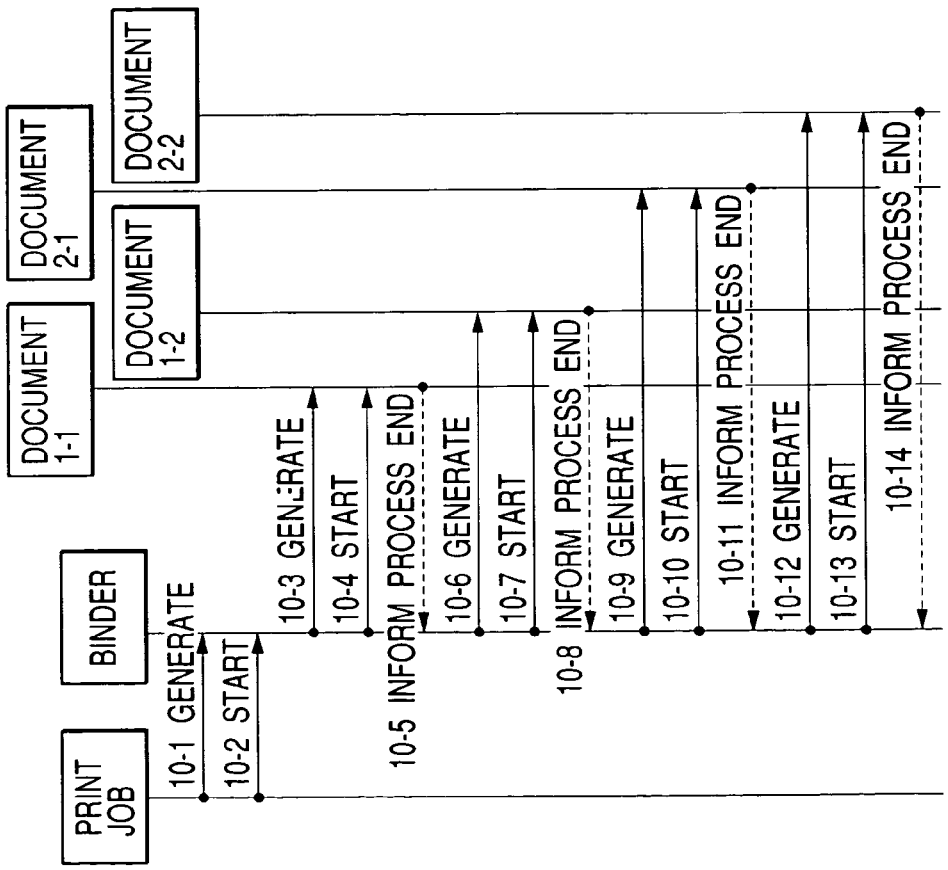
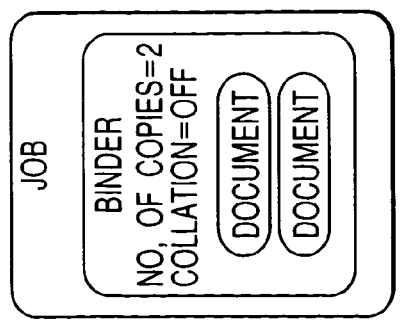

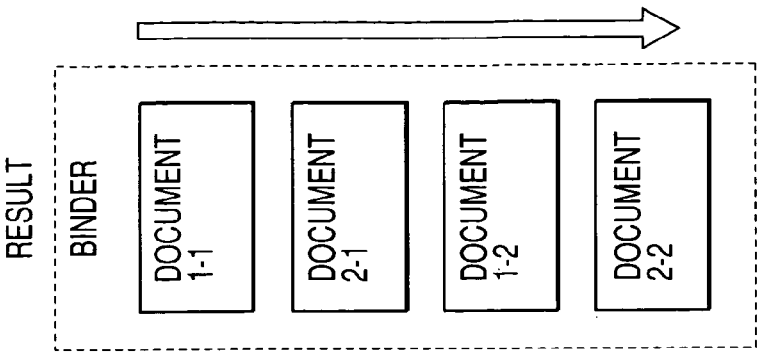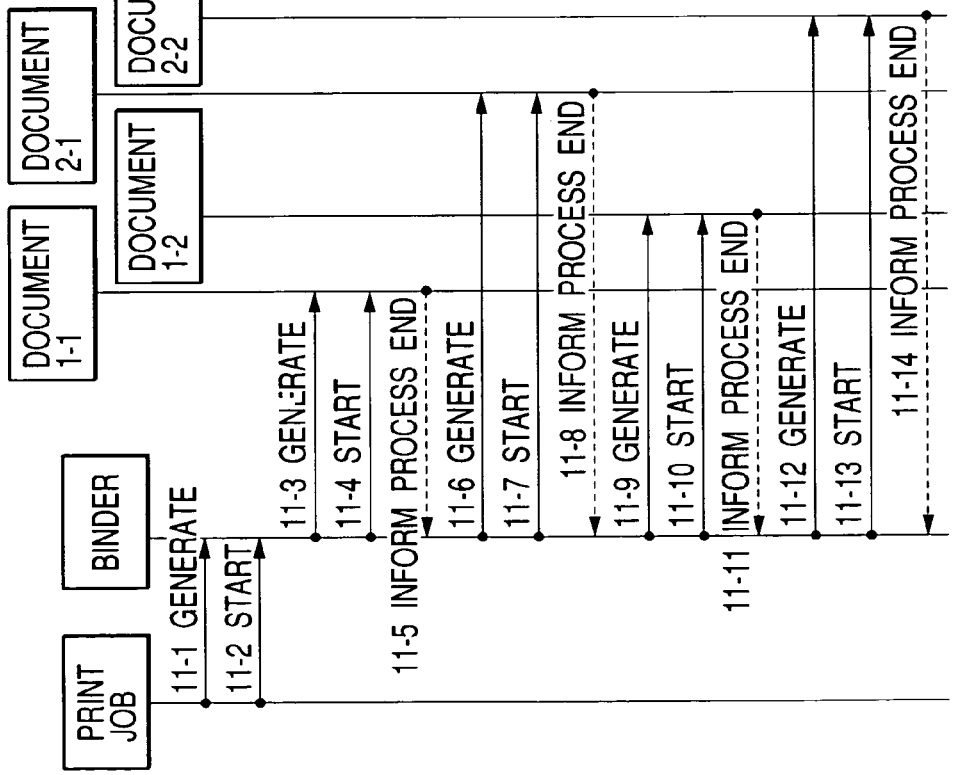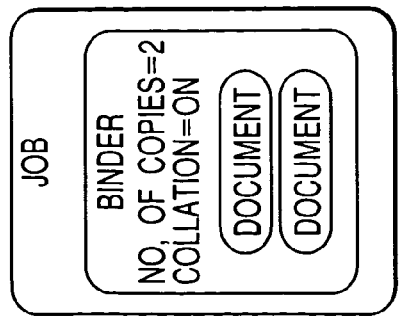

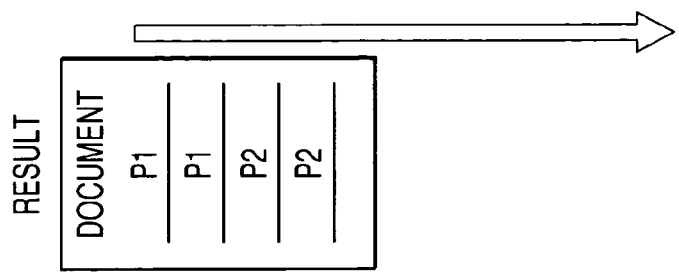
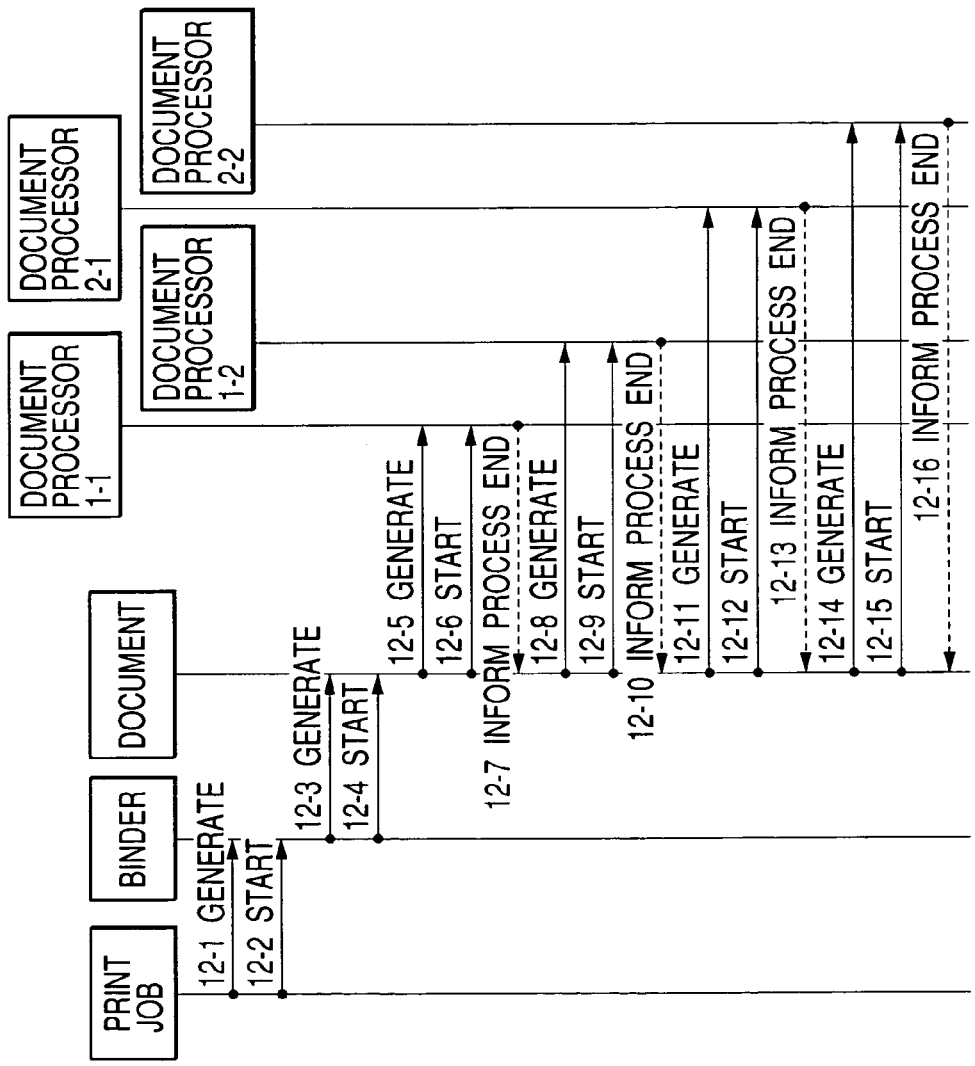
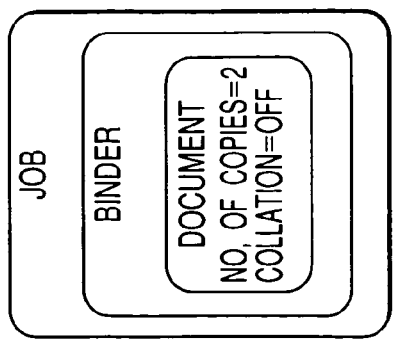

IMAGE FORMING APPARATUS AND IMAGE FORMING METHOD

BACKGROUND OF THE INVENTION

1. Field of the Invention

The present invention relates to an information processing method for information processing by an information processing system including peripheral devices such as a printer a facsimile (fax), a copying apparatus, a digital composite apparatus etc., and an information processing system and a memory medium therefor.

2. Related Background Art

Conventionally, the digital composite apparatus has developed as an extension of the conventional apparatus such as the addition of a fax function to a copying apparatus or the addition of a printer function to a facsimile. Therefore the apparatuses capable of composite operations are limited, and, even if the composite operations are possible, they can only execute composite operations or parallel operations in the unit of a job.

Also in the conventional digital composite apparatus and single-function apparatus, the processes of a series of jobs are executed in a predetermined order corresponding to the provided input/output devices or to the data format.

However, in the above-described conventional examples, since the jobs are controlled serially, it is essential to reconstruct the processes of the serial jobs in case a new input/output device is added or in case the correspondence has to be made to the data format and a large amount of labor and time is required for such works.

Also, through it is possible to select the order of output in case of outputting the document in plural copies, but it is not possible to execute detailed setting on the order of output in case of outputting plural documents in a job, and also not possible to execute detailed setting on the finishing such as stapled sorting, shift sorting, rotated sorting etc.

SUMMARY OF THE INVENTION

In consideration of the foregoing, the object of the present invention is to provide an information processing method capable of flexibly adapting to the addition of a new function with little labor and time, and a system and a memory medium therefor.

The above-mentioned object can be attained, according to the present invention, by an image forming apparatus capable of generating a job based on procedure information received from an information processing apparatus, generating an instance of hierarchical structure based on the generated job, determining a device to be used based on the procedure information among plural devices provided in the image forming apparatus, and assigning the instance of the generated hierarchical structre to the determined device.

BRIEF DESCRIPTION OF THE DRAWINGS

FIGS. 8A, 8B, 9A, 9B, 10A, 10B, 11A and 11B are views showing examples of job, binder and document execution processes in a job processor;

FIG. 14 is a view showing an example of the input/output mode in a binding output mode;

FIGS. 19A, 19B, 19C, 20A, 20B and 20C are views showing examples of an output copy number/output order execution process executed by a job;

FIGS. 21A, 21B, 21C, 22A, 22B and 22C are views showing examples of an output copy number/output order execution process executed by a binder;

FIGS. 23A, 23B, 23C, 24A, 24B and 24C are views showing examples of an output copy number/output order execution process executed by a document;

DETAILED DESCRIPTION OF THE PREFERRED EMBODIMENTS

Now the present invention will be clarified in detail by embodiments thereof, with reference to the accompanying drawings.

<First Embodiment>

Figure 1:
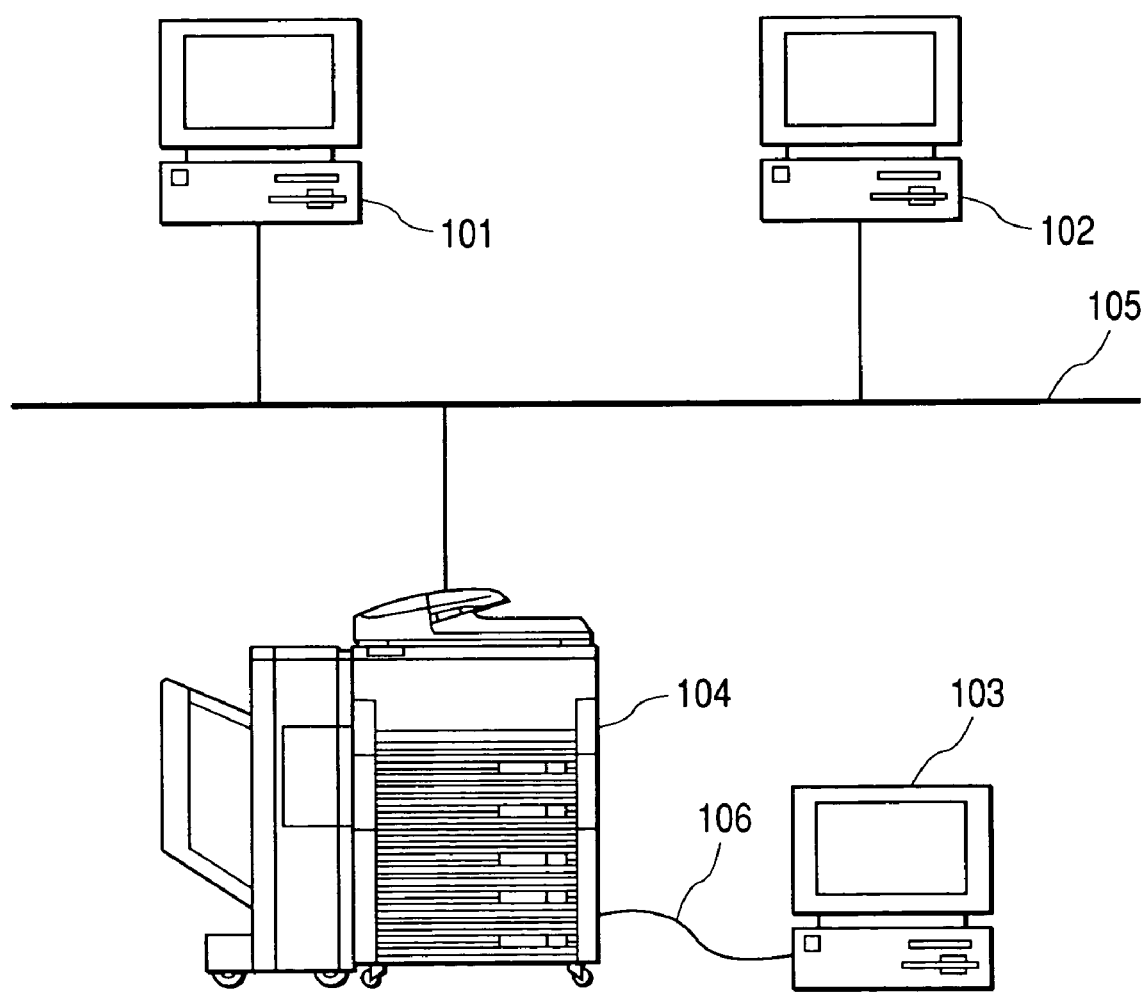
FIG. 1 is a view showing the configuration of an information processing system constituting a first embodiment of the present invention.

At first there will be explained a first embodiment of the present invention, with reference to FIGS. 1 to 11B. FIG. 1 is a view showing the configuration of an information processing system constituting a first embodiment of the present invention, wherein host computers (information processing apparatus) 101, 102, 103 generate various jobs and transmit the jobs to peripheral devices. A digital composite apparatus 104 constituting a peripheral device executes various jobs such as a print job, a scan job, a fax job, a copy job etc. The first and second host computers 101, 102 and the digital composite apparatus 104 are respectively connected to a LAN (local area network) 105 whereby the first and second host computers 101, 102 can utilize the digital composite apparatus 104. The third host computer 103 is connected to the digital composite apparatus 104 through an parallel (or serial) interfaced 106 instead of the LAN, thereby being capable of utilizing the digital composite apparatus 104.

Figure 2:
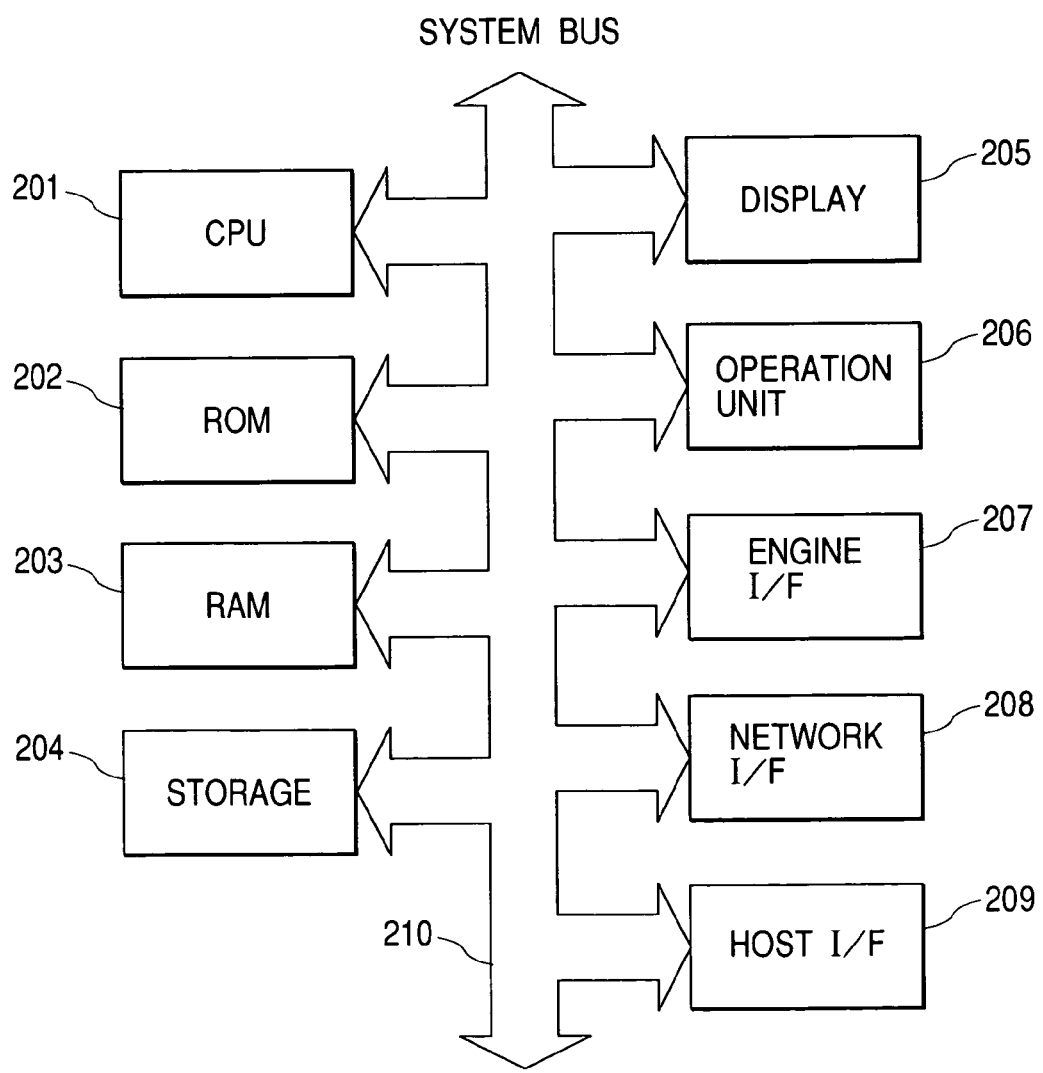
FIG. 2 is a block diagram showing the basic configuration of the information processing system.

FIG. 2 is a block diagram showing the basic configuration of the information processing system shown in FIG. 1, wherein provided a CPU (central processing unit) 201 for controlling the entire system and executing variious operations, a ROM (read-only memory) 202 storing a system booting program, a program for controlling a printer engine, character data, character codes etc., a RAM (random access memory) 203 constituting a memory area for various purposes such as for storing font data additionally registered by downloading or for storing and executing progams and data of various processes.

An external storage device 204 such as a hard disk is used for spooling a print job accepted by a printing apparatus (printer), for storing programs and various information files and as a work area. A display unit 205 such as a liquid crystal display is used for displaying the set state of the printing apparatus, or the current process state or error state in the printing apparatus. An operation unit 206 is used for changing the setting or resetting of the printing apparatus. An engine interface a(I/F) 207 is used for exchanging commands for actually controlling the engine. A network interface (I/F) 208 is used for connecting devices to the network. An external interface (I/F) 209 is connected to the host computer through a parallel (or serial) interface. A system bus 210 constitutes the data path among the above-described components.

Figure 3:
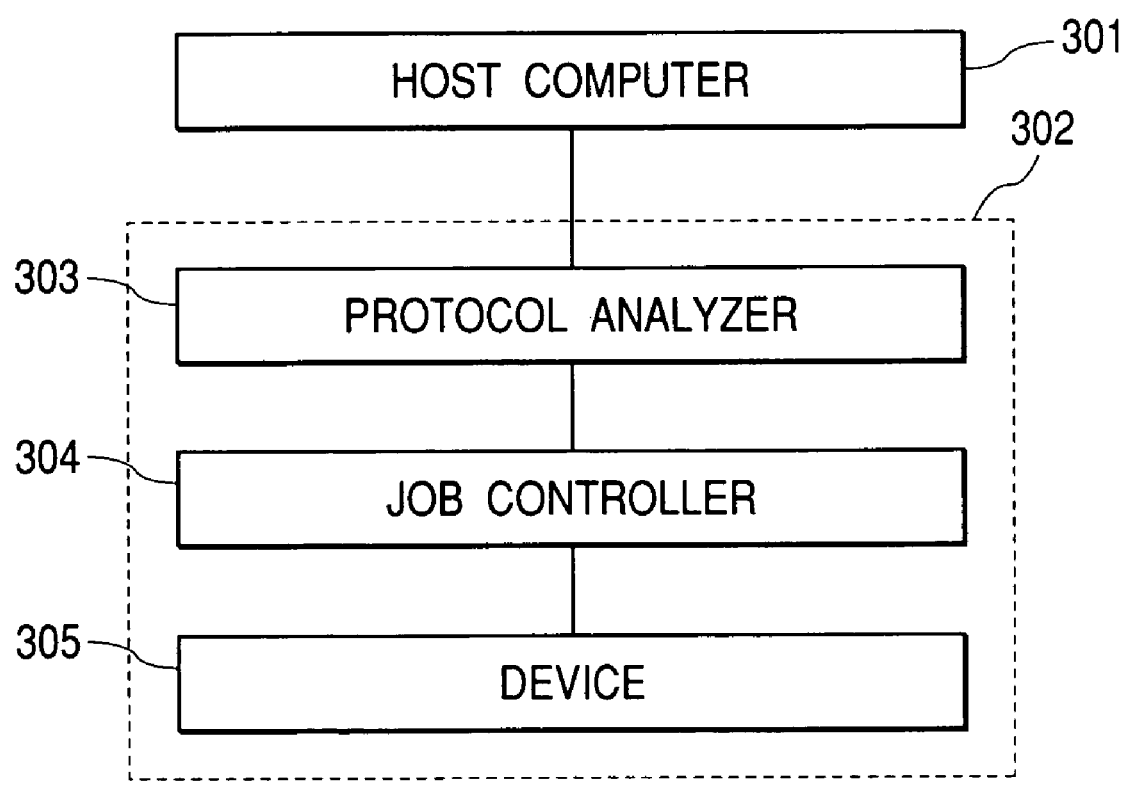
FIG. 3 is a view showing the internal software structure of a host comoputer and a digital composite apparatus.

FIG. 3 is a view showing the software structure inside the host computers and the digital composite apparatus 104, wherein 301 is a host computer (corresponding to the host computers 101 to 103 in FIG. 1) and 302 is a controller software which is internally divided into a protocol analyzer (protocol analyzing means) 303, a job controller 304 and a device 305.

The protocol analyzer 303 analyzes a command (protocol) transmitted from the host computer 301 through the LAN 105 shown in FIG. 1 or the external I/F 209 shown in FIG. 2, and requests the job execution to the job controller 304, which actually processes the job requested by the protocol analyzer 303. The device 305 is used at the job execution by the job controller 304.

Figure 4:
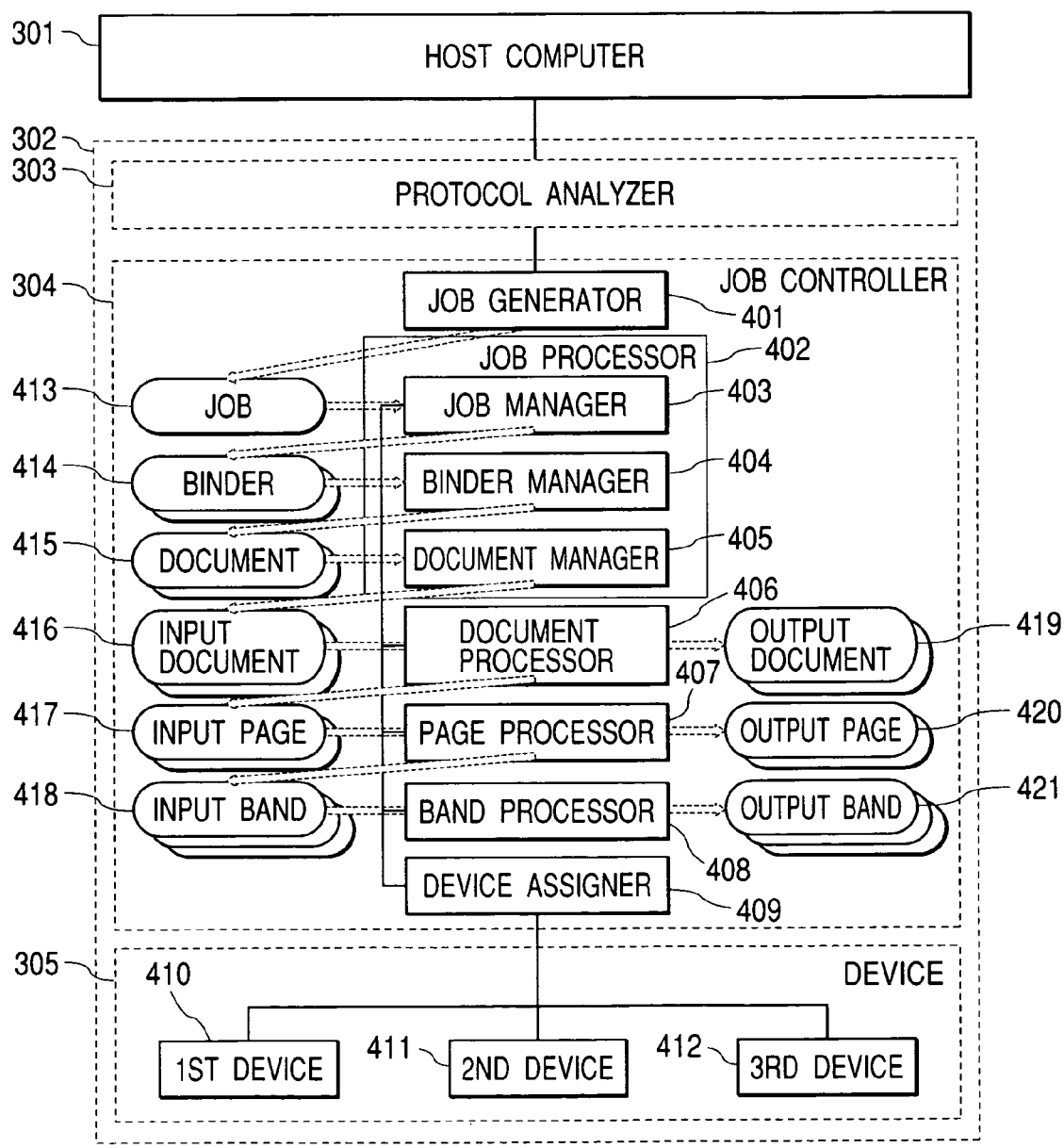
FIG. 4 is a block diagram outlining a controller software etc.

FIG. 4 is a block diagram outlining the controller software 302 etc. In FIG. 4, the controller software 302 includes a protocol analyzer 303, a job controller 304, a device 305. The host computer 301 is connected to the protocol analyzer 303 in the controller software 302.

The job controller 304 is provided with a job generator (job generation means) 401, a job processor (job process means) 402, a document processor (document process means, page generation means) 406, a page processor (page process means, band generation means) 407, a band processor (band process means) 408, and a device assigner (device use request arbitration means) 409. The job processor 402 is provided with a job manager (job management means) 403, a binder manager (binder management means) 404, and a document manager (document management means, document generation means) 405.

In this manner, the processors 402, 406, 407, 408 are provided in hierarchical structure in which a processor of an upper hierarchical layer generates an instance for a processor of a lower hierarchical layer.

Also the device 305 is provided with plural devices such as a first device 410, a second device 411, a third device 412 etc. Such device can be, for example, a scanner, a printer, a finisher or a rasterizer.

The device assigner 409 determines a device to be used from the plural devices according to the result of analysis of the protocol analyzer 303, and assigns thus determined device to the devices 406 to 408.

A request for a series of operations from the first host computer 101 to 103 is transmitted in the form of a command (protocol) through the network I/F 208 and the external I/F 209. The command can also be entered from the operation unit 206. The transmitted command is analyzed in the protocol analyzer 303 and is then transmitted to the job controller 304. In this operation, the command is converted into a form understandable by the job controller 304.

The job generator 401 generates a job 413, which can be in various forms, such as a copy job, a print job, a scan job or a fax job. For example, in case of a print job, the job includes the name of the document to be printed, the number of print copies, setting information such as the designation of an output discharge tray, the print data themselves (PDL (page description language)). The job 413 is transmitted to the job processor 402 which executes setting and processing on the entire job 413.

In the job processor 402, the job manager 403 executes setting on the entire job and various processes such as the collective printing of plural binders constituting the job. The binder manager 404 executes setting on the entire binder and various processes such as the collective printing of plural documents constituting a binder. A document manager 405 executes setting on the entire document and various processes such as the collecting printing of plural pages constituting a document.

Also the job processor 402 executes, in addition to the setting and processes on the entire job 413, a division of the job into binders 414 which are smaller work units constituting the job, and, in addition to the setting and processes on the entire binder 414, a division of the binder into documents 415 which are smaller work units constituting the binder, and, in addition to the setting and processes on the entire document 415, a division of the document into input documents 416 which are smaller work units.

The input document 416 is converted by the document processor 406 into an output document 419. As an example, in case of a scan job of reading a bundle of originals by a scanner and converting it into plural image data, the input document 416 describes the setting and the operation procedure on the bundle of the originals, while the output document 419 describes the setting and the operation procedure on the plural image data. The document processor 406 performs the function of converting the sheet bundle into the plural image data.

Also the document processor 406 only executes the process in the unit of a document and generates input pages 417 which are smaller work units. This is similar to the job processor 402 in that it only executes the process in the unit of a job and generates documents for a smaller work. The setting and operation in the unit of a document relate more specifically to the order of pages such as rearrangement of pages, designation of two-side printing, addition of a cover sheet, and an OHP sheet insertion.

The input page 417 is converted by the page processor 407 into an output page 420. For example, in the aforementioned scan job, the input page 417 describes the setting and procedure for the reading resolution, direction of reading (landscape/portrait) etc., and the output page 420 describes the setting and procedure for the storage position of the image data (address and data name of the RAM 203 or the external storage device 204).

In the foregoing there has been explained to gradually reduce the unit of the job so as to be processable in the unit of a page. In an expensive system capable of having a page memory of a capacity of a page, it is enough to break down the job eventually to the unit of a page. In practice, however, there can be conceived a system provided with a memory of several lines (band memory), in consideration of the memory cost or in case of a low-speed system such as an ink jet printer. In such case, the page is handled by being divided into bands (stripe-shaped data) which are even finer units This explains the role of an input band 418, a band processor 408 and an output band 421, and the functions thereof are similar to those in case of the page.

The job processor 402, the document processor 406, the page processor 407 and the band processor 408 respectively utilize devices in the process execution. Therefore, there naturally occurs a competition of the devices when the plural processors simultaneously execute processes, and such competition is arbitrated by the device assigner 409. First to third devices 410 to 412, being assigned to the above-mentioned processors by the device assigner 409, can be, for example, a page memory, a band memory, a document feeder, a marking engine, a scanner etc.

Figure 5:
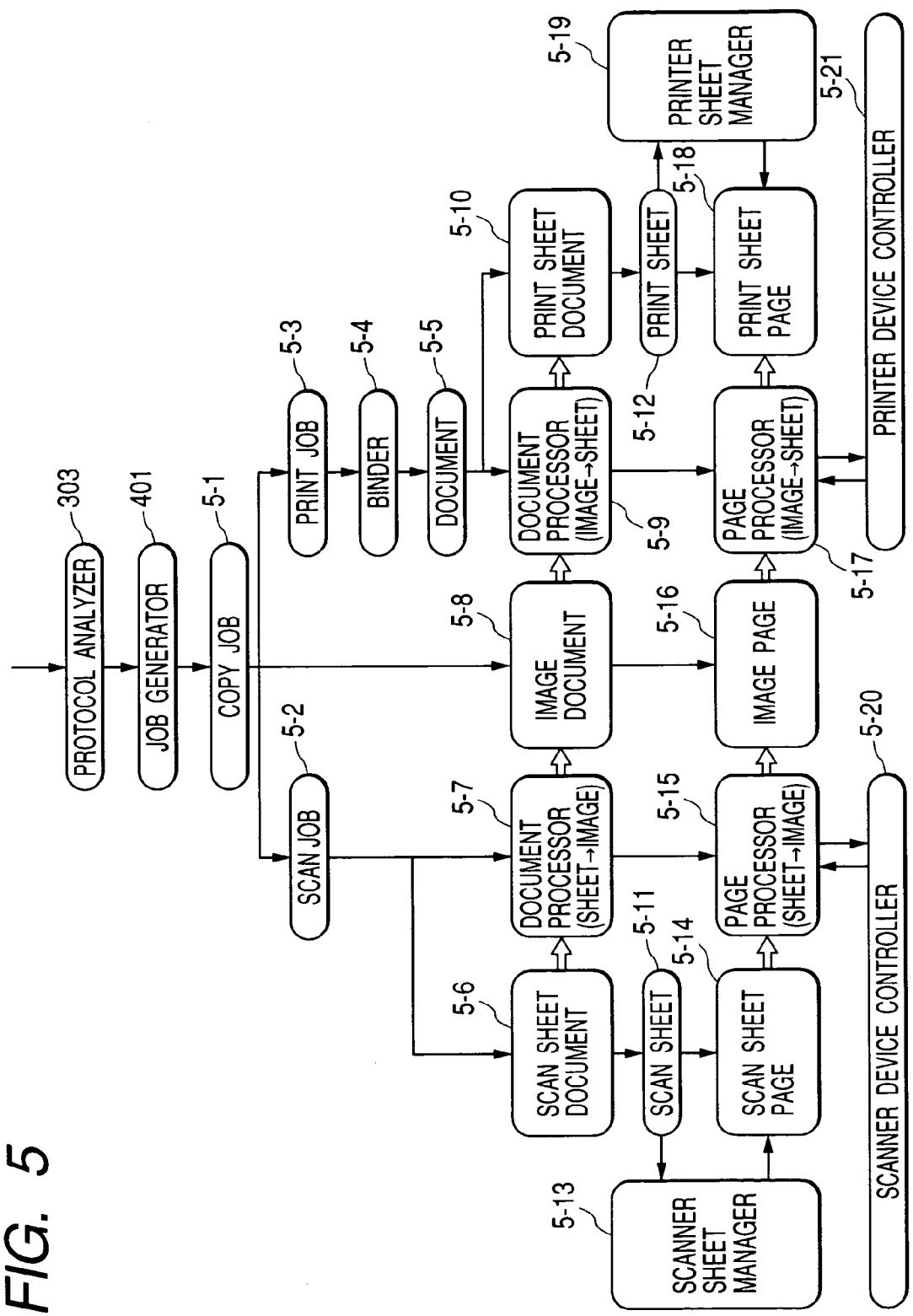
FIG. 5 is a view showing an example of a copy job execution process.

FIG. 5 is a view showing an example of a copy job execution process.

A request for a series of operations, from the host computer 101, 102 or 103 or the panel of the composite apparatus 104, is transmitted in the form of a command (protocol) through the operation unit 206, the network I/F 208 and the external I/F 209. The transmitted command is analyzed by the protocol analyzer 303 and is transmitted to the job controller 304. At this point, the command is converted into a form understandable by the job controller 304.

The job generator 401 analyzes the transmitted command and generates a copy job 5-1, which is a composite job having the function of realizing copy. There are also generated a scan job (single job) 5-2, a print job (single job) 5-3 and an empty image document 5-8 which is an output document of the scan job 5-2 and an input document of the print job 5-3.

The image document 5-8 generates an empty image page 5-16 of an even smaller unit, constituting an output page of the scan job 5-2 and an input page of the print job 5-3. The scan job 5-2 and the print job 5-3 are processed in succession by the job processor 402.

When the scan job 5-2 is transferred to the job processor 402, there are executed setting and process on the entire scan process. Other setting and process than those relating to the entire scan process are divided and processed in scan sheet documents 5-6 which are of an even smaller work unit. The scan sheet document 5-6 is converted by a document processor (sheet→image) 5-7 into an image document 5-8. The document processor 5-7 only executes the process in the unit of a document and finer processes are executed by a scan sheet page 5-14 which is an even smaller work unit.

At first the scan sheet document 5-6 generates a sheet image 5-11 corresponding to an actual page of the original to be subjected to the image reading. The scan sheet 5-11, upon generation, registers itself (scan sheet 5-11) with an identifier in a scanner sheet manager 5-13 for controlling the order of processing of the original.

The scanner sheet manager 5-13 determines the order of processing of the scan sheet pages 5-14 according to the identifier attached to the scan sheet 5-11 or the device specifications. The scan sheet page 5-14 is converted by a page processor (sheet→image) 5-15 into an image page 5-16. The page processor 5-15 has a sequence for controlling the actual scanner device, and issues a command to a scanner controller 5-20 for controlling the scanner device while communicating with the scan sheet page 5-14 and the image page 5-16, thereby realizing the scan operation. The image page 5-16 can be stored in the RAM 203 or the external storage 204, and is correlated in the unit of processors, such as the job processor 402, the document processor 406 the page processor 407 and the band processor 408.

When the print job 5-3 is transferred to the job processor 402, the setting and process other than those relating to the entire job are divided into binders 5-4 constituting even smaller work units, and the setting and process other than those relating to the entire binder are further divided into documents 5-5 whereby achieved are the setting and process on the entire print process. Furthermore, the setting and process other than those relating to the entire print process are divided and processed in the print sheet documents 5-10 constituting even smaller work units. The print sheet document 5-10 is obtained by the conversion by the document processor (image→sheet) 5-9 of the image document 5-8 which is obtained by conversion by the document processor 5-7.

The document processor 5-9 only executes the process in the unit of a document, and finer processes are executed in the print sheet page 5-18 constituting a smaller work unit. At first, the print sheet document 5-10 generates a print sheet 5-12 corresponding to an actual page of image output. The print sheet 5-12, upon generation, registers itself (print sheet) with an identifier in a print sheet manager 5-19 for controlling the order of process of the pages, and then generates a print sheet page 5-18.

The print sheet manager 5-19 determines the order of process of the print sheet pages 5-18 according to the identifieer attached to the print sheet 5-12 and the device specifications. The print sheet page 5-18 is obtained by conversion by the page processor 5-17 of the image page 5-16 which is obtained by conversion by the page processor (sheet→image) 5-15. The page processor 5-17 has a sequence for controlling the actual printer device, and issues a command to a printer controller 5-21 for controlling the printer device while communicating with the print sheet page 5-18 and the image page 5-16 thereby realizing the print operation.

The copy operation is thus realized by the above-described sequential operations in which the control is assigned in succession to the processors handling the smaller work units.

Figure 6:
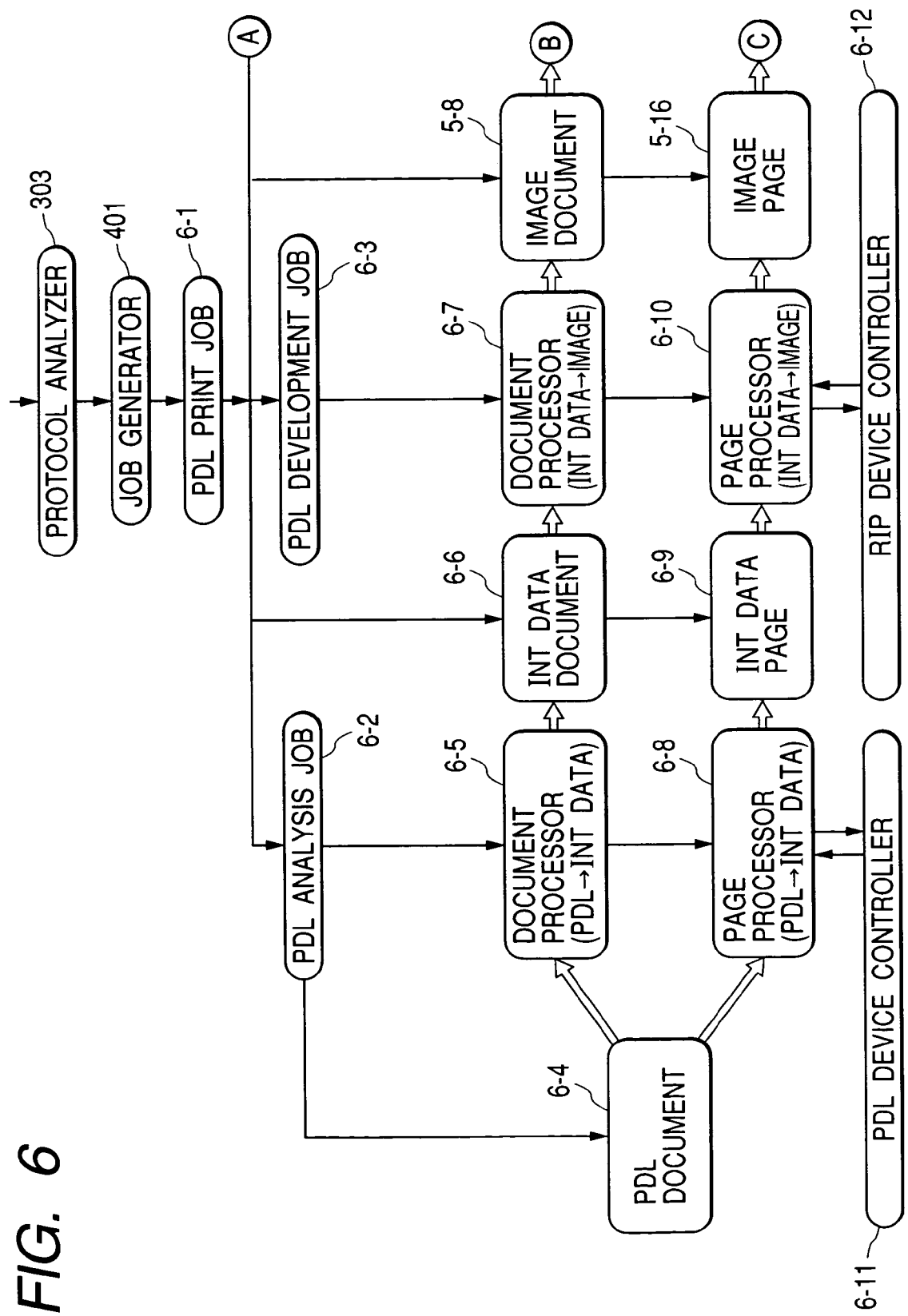
FIGS. 6 and 7 are views showing an example of a PDL print job execution process.
Figure 7:
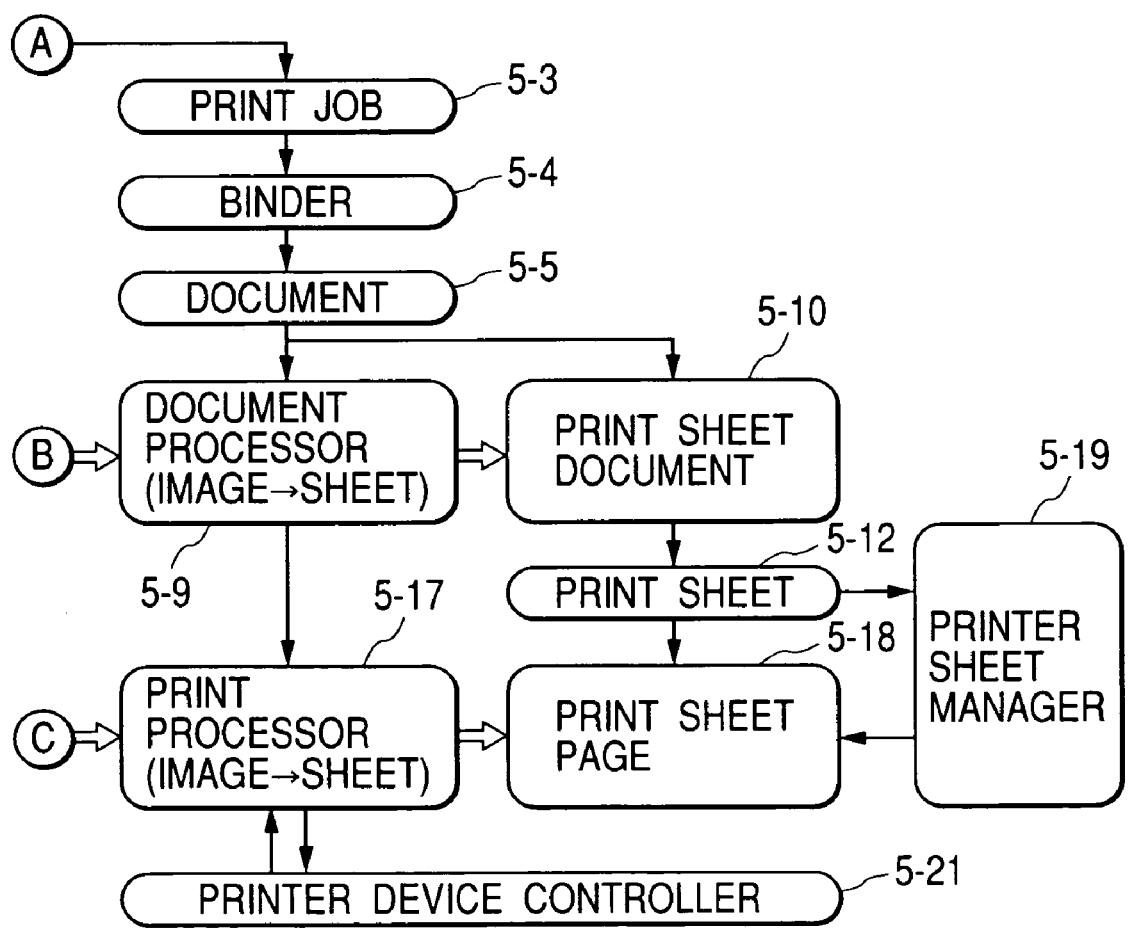

FIGS. 6 and 7 are views showing an example of a PDL print job execution process.

A request for a series of operations, from the host computer 101, 102 or 103 or the panel of the composite apparatus 104, is transmitted in the form of a command (protocol) through the operation unit 206, the network I/F 208 and the external I/F 209. The transmitted command is analyzed by the protocol analyzer 303 and is transmitted to the job controller 304. At this point, the command is converted into a form understandable by the job controller 304.

The job generator 401 analyzes the transmitted command and generates a PDL print job 6-1, which generates a PDL analysis job (single job) 6-2, a PDL development job (single job) 6-3 and a print job (single job) 5-3, having the function of realizing the PDL print, and also generates an empty intermediate data document 6-6 which is an output document of the PDL analysis job 6-2 and and an input document of the PDL development job 6-3, and an empty image document 5-8 which is an output document of the PDL development job 6-3 and an input document of the print job 5-3.

The intermediate data document 6-6 generates an empty intermediate data page 6-9 of an even smaller unit, constituting an output page of the PDL analysis job 6-2 and an input page of the PDL development job 6-3, and the image document 5-8 generates an empty image page 5-16 of an even smaller unit, constituting an output page of the PDL development job 6-3 and an input page of the print job 5-3. The PDL analysis job 6-2, the PDL development job 6-3 and the print job 5-3 are processed in succession by the job processor 402.

At first the PDL analysis job 6-2 is transferred to the job processor 402 for executing setting and process on the entire job. The setting and process other than those relating to the entire job are divided and processed in PDL documents 6-4 which are of an even smaller work unit. The PDL document 6-4 is converted by a PDL document processor (PDL→intermediate data) 6-5 into an intermediate data document 6-6. The PDL document processor 6-5 only executes the process in the unit of a document and finer processes are converted by a PDL page processor (PDL→intermediate data) 6-8 into intermediate data pages 6-9 which are even smaller work units. The PDL page processor 6-8 has a sequence for controlling an actual PDL device such as a PDL interpreter, and issues a command to a PDL device controller 6-11 for controlling the PDL device while communicating with the pages in the PDL document 6-4 and the intermediate data page 6-9, thereby realizing the PDL analysis operation.

Then the PDL development job 6-3 is transferred to and processed by the job processor 402. As in the case of the PDL analysis job 6-2 explained above, the setting and process other than those relating to the entire job are divided and processed in intermediate data documents 6-6 constituting even smaller work units. In these operations, for the intermediate data document 6-6 constituting the input document of the PDL development job 6-3, there is designated the output document used in the foregoing PDL analysis job 6-2.

The intermediate data document 6-6 is converted by an intermediate data document processor (intermediate data→image) 6-7 into an image document 5-8. The intermediate data document processor 6-7 only executes the process in the unit of a document, and for finer processes there are generated intermediate data pages 6-9 constituting smaller work units. For the intermediate data page 6-9, there is designated the output document of the PDL analysis job 6-2 explained in the foregoing. The intermediate data page 6-9 is converted by an intermediate data page processor (intermediate data→image) 6-10 into an image page 5-16.

The intermediate data page processor 6-10 has a sequence for controlling the actual RIP (raster image processor) device, and issues a command to a RIP device controller 6-12 for controlling the RIP device while communicating with the intermediate data page 6-9 and the image page 5-16 thereby realizing the PDL development operation. The image page 5-16 can be stored in the RAM 203 or the external storage 204, and is correlated in the unit of the processors including the job processor 402, the document processor 406, the page processor 407 and the band processor 408.

In case the print job 5-3 is transferred to the job processor 402, there is executed a process same as explained in FIG. 5 to realize the print operation. In the example shown in FIGS. 6 and 7, the print sheet document 5-10 is obtained by conversion by the document processor 5-9 of the image document 5-8 which is obtained by conversion by the intermediate data document processor 6-7. Also the print sheet page 5-18 is obtained by conversion by the page processor 5-17 of the image page 5-16, which is obtained by conversion by the intermediate data page processor 6-10.

The PDL print operation is thus realized by the above-described sequential operations in which the control is assigned in succession to the processors handling the smaller work units.

FIGS. 8A, 8B, 9A, 9B, 10A, 10B, 11A and 11B are views showing examples of the process for executing a job 413, a binder 414 and a document 415 in the job processor 402. These drawings illustrate the configuration of the input document 416 and the output document 419 under the control of the job manager 403.

As explained in the foregoing, a command constituting a request for a series of operations, from the host computer 101, 102 or 103 or the panel of the composite apparatus 104, is transmitted is analyzed by the protocol analyzer 303 and is transmitted to the job controller 304.

FIG. 8A shows a case where, as a result of the analysis by the job processor 402, a job 7-1 includes a binder 7-2-1 which includes a document 7-3-1.

As shown in FIG. 8B, a print job 5-3 generates a binder 5-4-1 constituting a smaller work unit and assigns thereto the setting and process other than those relating to the entire job. The binder 5-4-1 generates a document 5-5-1 constituting a smaller work unit and assigns thereto the setting and process other than those relating to the entire binder. A document processor (image→sheet) 5-9-1 converts an image document 5-8-1 constituting an input document into a print sheet document 5-10-1 thereby outputting a sheet.

Figure 9B:
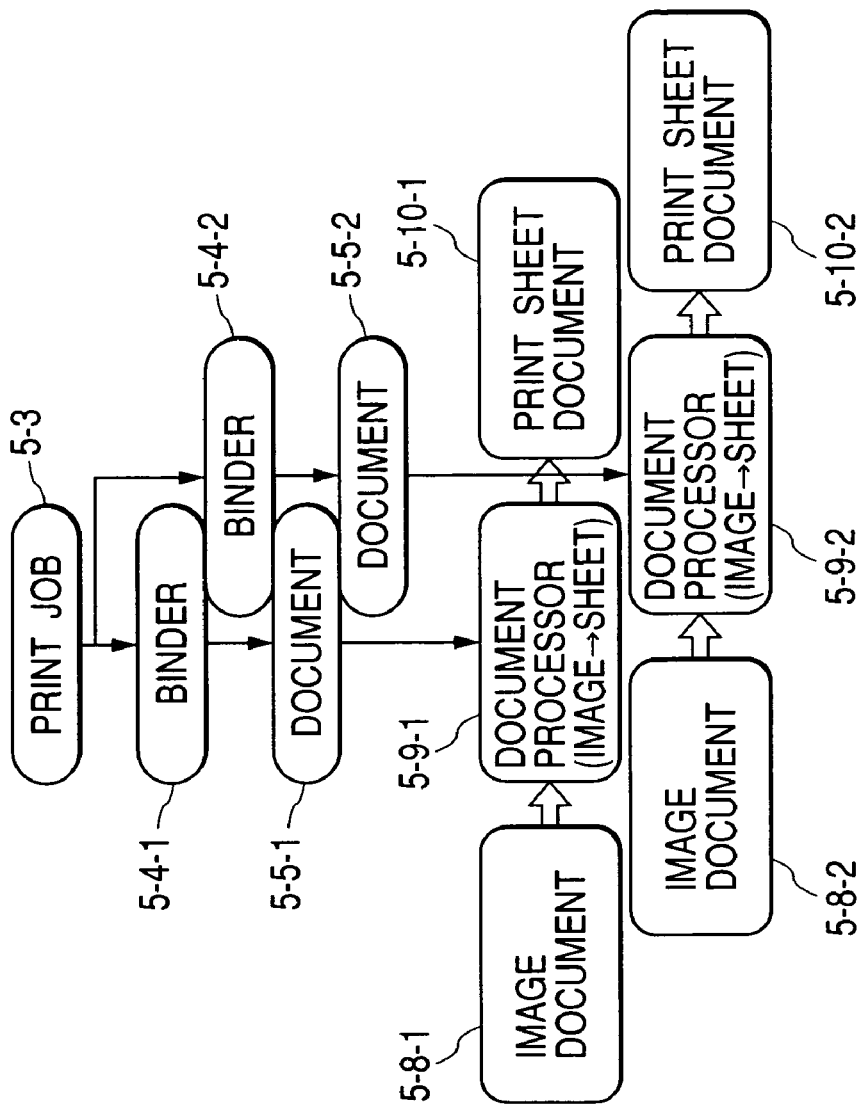
Figure 9A:
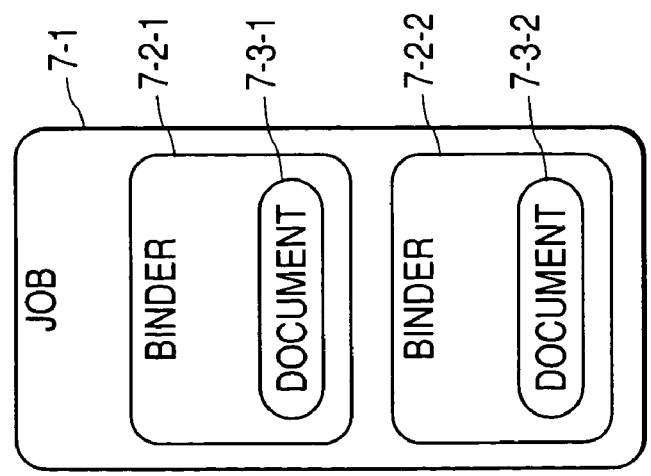

FIG. 9A shows a case where, as a result of the analysis by the job processor 402, a job 7-1 includes two binder 7-2-1, 7-2-2 which respectively include documents 7-3-1, 7-3-2.

As shown in FIG. 9B, the print job 5-3 generates a binder 5-4-1 constituting a smaller work unit and assigns thereto the setting and process other than those relating to the entire job. The binder 5-4-1 generates a document 5-5-1 constituting a smaller work unit and assigns thereto the setting and process other than those relating to the entire binder. The document processor (image→sheet) 5-9-1 converts an image document 5-8-1 constituting an input document into a print sheet document 5-10-1 thereby outputting a sheet.

Then the print job 5-3 generates a binder 5-4-2 and assigns the process thereto. The binder 5-4-2 generates a document 5-5-2 constituting a smaller work unit and assigns thereto the setting and process other than those relating to the entire binder. A document processor (image→sheet) 5-9-2 converts an image document 5-8-2 constituting an input document into a print sheet document 5-10-2 thereby outputting a sheet.

Figure 10B:
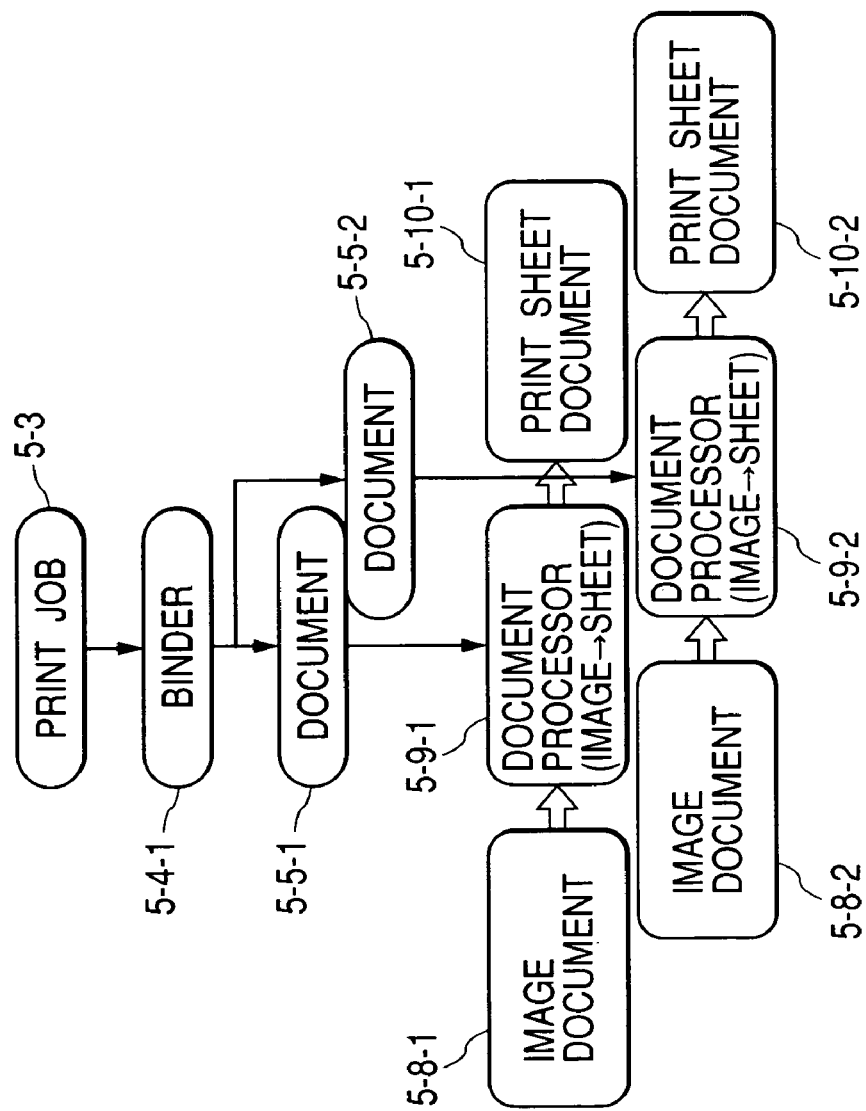
Figure 10A:
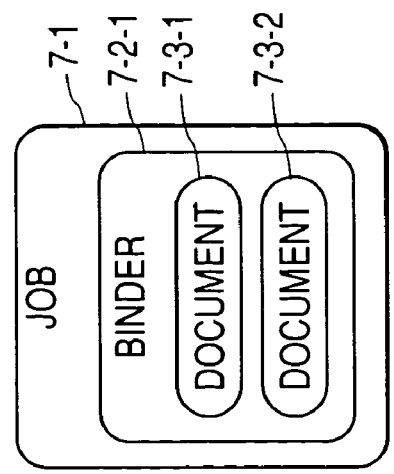

FIG. 10A shows a case where, as a result of the analysis by the job processor 402, a job 7-1 includes a binder 7-2-1, which includes two documents 7-3-1, 7-3-2.

As shown in FIG. 10B, the print job 5-3 generates a binder 5-4-1 constituting a smaller work unit and assigns thereto the setting and process other than those relating to the entire job. The binder 5-4-1 generates a document 5-5-1 constituting a smaller work unit and assigns thereto the setting and process other than those relating to the entire binder. A document processor (image→sheet) 5-9-1 converts an image document 5-8-1 constituting an input document into a print sheet document 5-10-1 thereby outputting a sheet.

Then the binder 5-4-1 generates a document 5-5-2 constituting an even smaller work unit and assigns the process thereto. A document processor 5-9-2 converts an image document 5-8-2 constituting an input document into a print sheet document 5-10-2 thereby outputting a sheet.

Figure 11B:
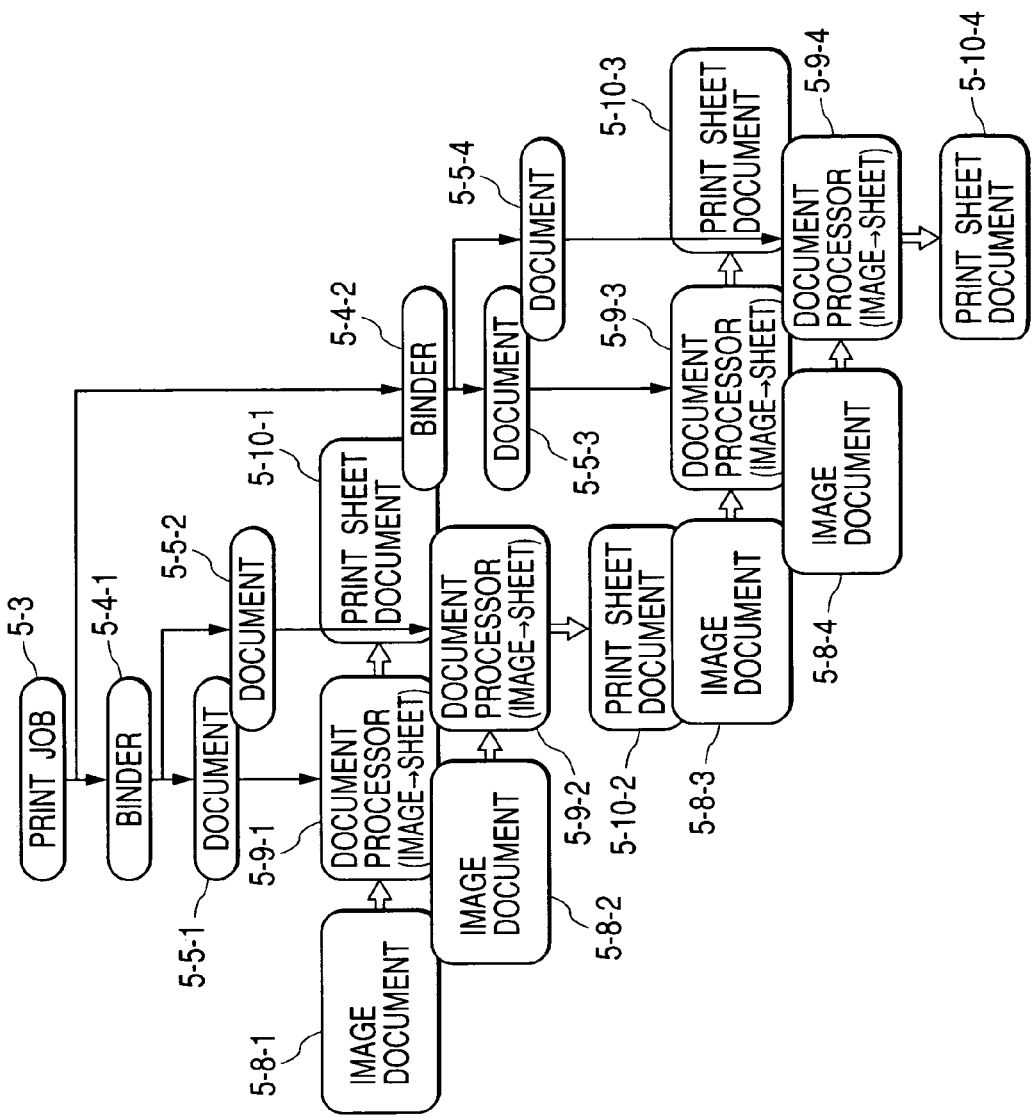
Figure 11A:
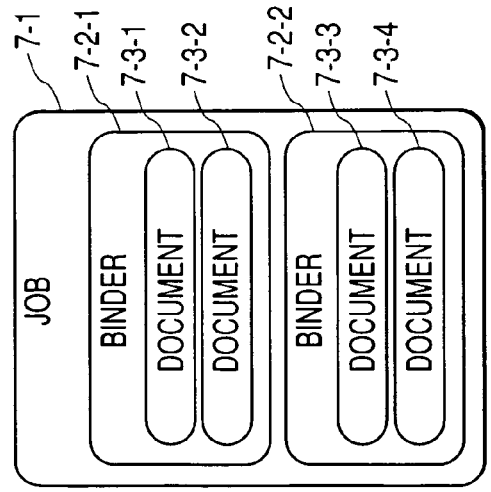

FIG. 11A shows a case where, as a result of the analysis by the job processor 402, a job 7-1 includes two binders 7-2-1, 7-2-2 in which the binder 7-2-1 includes two documents 7-3-1, 7-3-2 while the binder 7-2-2 includes two documents 7-3-3, 7-3-4.

As shown in FIG. 11B, the print job 5-3 generates a binder 5-4-1 constituting a smaller work unit and assigns thereto the setting and process other than those relating to the entire job. The binder 5-4-1 generates a document 5-5-1 constituting a smaller work unit and assigns thereto the setting and process other than those relating to the entire binder. A document processor (image→sheet) 5-9-1 converts an image document 5-8-1 constituting an input document into a print sheet document 5-10-1 thereby outputting a sheet.

Then the binder 5-4-1 generates a document 5-5-2 constituting an even smaller work unit and assigns the process thereto. A document processor 5-9-2 converts an image document 5-8-2 constituting an input document into a print sheet document 5-10-2 thereby outputting a sheet.

Then the print job 5-3 generates a binder 5-4-2 and assigns the process thereto. The binder 5-4-2 generates a document 5-5-3 constituting an even smaller work unit and assigns thereto the setting and process other than those relating to the entire binder. A document processor (image→sheet) 5-9-3 converts an image document 5-8-3 constituting an input document into a print sheet document 5-10-3 thereby outputting a sheet.

Then the binder 5-4-2 generates a document 5-5-4 constituting an even smaller work unit and assigns the process thereto. A document processor (image→sheet) 5-9-4 converts an image document 5-8-4 constituting an input document into a print sheet document 5-10-4 thereby outputting a sheet.

The above-described procedure enables operations corresponding to various combinations of the binder 414 and the document 415 constituting the job 413, thereby enabling the output in various forms.

The present embodiment, easily adaptable to the addition of a new device, dispenses with the necessity of reconstructing the serial job process even in case a new input/output device is added or in case the correspondence with the data format is required. For example, in case a scanner of a new type is added, it is only required to provide means for controlling such added scanner if the format of the output document therefrom is same as the prior format, and there can be obtained a configuration in which the correspondence between the input document and the output document is made clear (for example a case including plural inputs and plural outputs in the unit of a document, such as a case of bundling a document prepared with a word processing software and a document prepared with a table calculating software into a document and outputting such document by printing with stapling and at the same time by fax transmission). It is therefore rendered possible to flexibly adapt to the addition of a new function with little labor and time.

<Second Embodiment>

In the following there will be explained a second embodiment of the present invention with reference to FIGS. 12 to 14. In the present embodiment, the information processing system is same in the basic configuration and processes as that in the foregoing first embodiment shown in FIGS. 1 to 7, and will therefore be explained with reference to these drawings wherever necessary.

Figure 12:
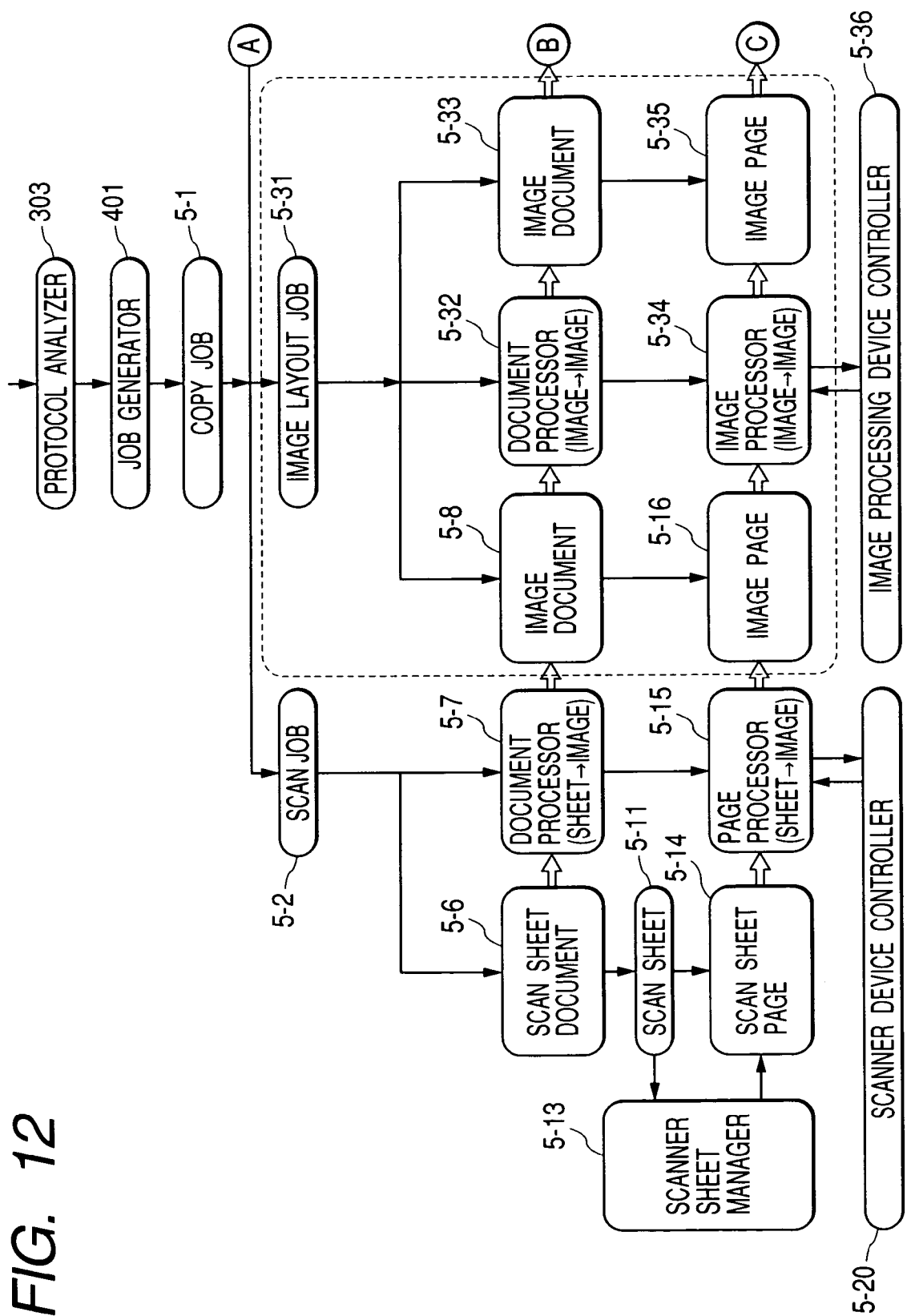
FIGS. 12 and 13 are views showing an example of a binding mode execution process in a copy job process in a second embodiment of the present invention.
Figure 13:
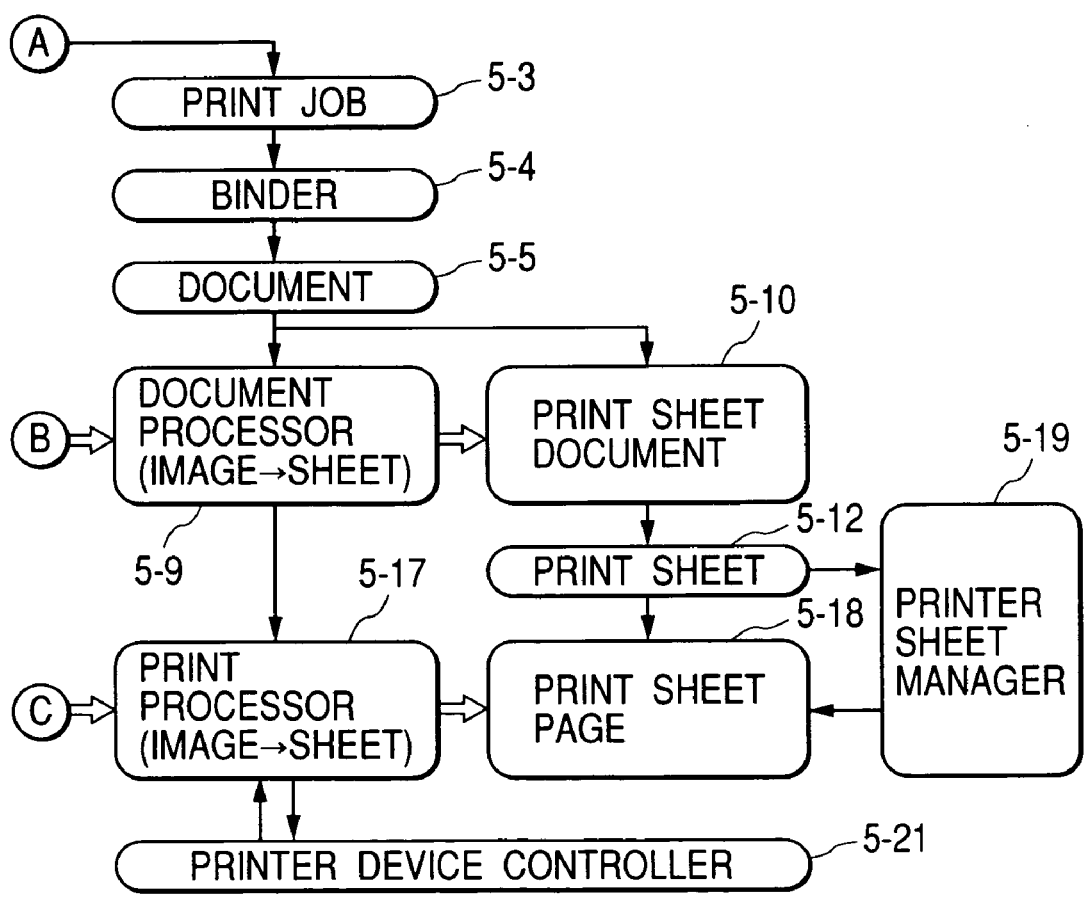

FIGS. 12 and 13 are views showing an example of the execution process of a book binding mode in a copy job process.

A command which is a request for a series of operations, transmitted from the host computer 101, 102 or 103 or the panel of the composite apparatus 104 as in the first embodiment, is analyzed by the protocol analyzer 303 and is transmitted to the job controller 304. At this point, the command is converted into a form understandable by the job controller 304.

The job generator 401 analyzes the transmitted command and generates a composite copy job 5-1, which generates a scan job (single job) 5-2 and a print job (single job) 5-3, having the function of realizing the copy. The copy job 5-1, upon detecting a book binding mode for output with book binding, generates an image layout job 5-31 for executing the book binding output. The scan job 5-2, the image layout job 5-31 and the print job 5-3 are processed in succession by the job processor 402.

At first the scan job 5-2 is transferred to the job processor 402 for executing setting and process on the entire scan job. The scan job 5-2 generates a scan sheet document 5-6 constituting an input document and a document processor (sheet→image) 5-7. For the output document, there is used an image document 5-8 generated by the image layout job 5-31.

The setting and process other than those relating to the entire scan process are divided and processed in scan sheet documents 5-6 which are of an even smaller work unit. The scan sheet document 5-6 is converted by a document processor 5-7 into an image document 5-8. The document processor 5-7 only executes the process in the unit of a document and finer processes are executed in scan sheet pages 5-14 which are of an even smaller work unit.

The process among the scan sheet document 5-6, the scan sheet 5-11, the scanner sheet manager 5-13, the scan sheet page 5-14, the page processor (sheet→image) 5-15, the image page 5-16 and the scanner controller 5-20 is same as in the first embodiment (FIG. 5).

The image layout job 5-31 is transferred to the job processor 402 for setting and process relating to the entire image layout, and generates an image document 5-8 constituting an input document, a document processor (image→image) 5-32 and an image document 5-33 constituting an output document.

The setting and process other than those relating to the entire image layout job are divided and processed in image documents 5-8 constituting even smaller work units. In these operations, the image document 5-8 is converted by the document processor 5-32 into the image document 5-33. The document processor 5-32 only executes the process in the unit of a document, and finer processes are executed in an image page 5-16 constituting an even smaller work unit.

The image page 5-16 is converted by a page processor (image→image) 5-34 into an image page 5-35. The page processor 5-34 has a sequence for controlling the image process device, and issues a command to an image process device controller 5-36 for controlling the image process device while communicating with the image page 5-16 and the image page 5-35 thereby realizing the image process. The image page 5-35 can be stored in the RAM 203 or the external storage 204.

When the print job 5-3 is transferred to the job processor 402, there are executed setting and process relating to the entire job. The print job 402 employs, as the input document, the image document 5-33 generated by the image layout job

5-31, and, generates a document procesor 5-9 and a print sheet document 5-10 constituting an output document.

The setting and process other than those relating to the entire print job are divided into binders 5-4 constituting even smaller work units, and the setting and process other than those relating to the entire binder are divided into documents 5-5 constituting even smaller work units to execute the setting and process for the entire print process. Also the setting and process other than those relating to the entire print process are divided and executed in print sheet documents 5-10 constituting even smaller work units. The print sheet document 5-10 is obtained by conversion by the document processor (image→sheet) 5-9 of the image document 5-33 which is obtained by conversion by the document processor 5-32.

The process among the document processor 5-9, the print sheet document 5-10, the print sheet 5-12, the page processor 5-18, the print sheet page 5-18, the printer sheet manager 5-19 and the printer controller 5-21 is same as in the first embodiment (FIG. 5). However, the print sheet page 5-18 is obtained by conversion by the page processor 5-17 of the image page 5-35 which is obtained by conversion by the page processor 5-34.

The copying operation with book binding is thus realized by the above-described sequential operations in which the control is assigned in succession to the processors handling the smaller work units.

Also in case of PDL, there can be obtained similar effects by causing the PDL print job to generate, upon detecting the book binding output mode, the image layout job 5-31 instead of the image document.

FIG. 14 is a view showing an example of input/output mode in the book binding output mode.

In an image document 5-8, there are contained images which are scanned by the scanner and accumulated in the RAM 203 or the external storage 204 under the control of the document processor 5-7, in the form of image pages 5-16 in the order of scan (1 to 8). The document processor 5-32 identifies the image pages 5-35 to be obtained by conversion, based on the instruction of the book binding output and various settings (book to be opened from the left or from the right, size of each page in the image document, output sheet size etc.). In the illustrated example, it is identified to form a page of the image document 5-33 in a 2-in-1 format, and the conversion from the image documents 5-8 to the image documents 5-33 is executed in the order of 81, 82, . . . , 88. Thus the book binding output can be realized by two-side printing of thus converted pages by the document processor 5-9.

The present embodiment not only provides the effects same as those of the first embodiment but also enables to flexibly adapt to the book binding output mode with little labor and time.

<Third Embodiment>

In the following there will be explained a third embodiment of the present invention with reference to FIGS. 15A to 24B. In the present embodiment, the information processing system is same in the basic configuration and processes as that in the foregoing first embodiment shown in FIGS. 1 to 7, and will therefore be explained with reference to these drawings wherever necessary.

FIGS. 15A, 15B, 16A, 16B, 17A, 17B, 18A and 18B are views showing examples of the execution process of a job 413, a binder 414 and a document 415 in the job processor 402. These drawings show the configuration of the input document 416 and the output document 419 under the control of the job manager 403.

A command which is a request for a series of operations, transmitted from the host computer 101, 102 or 103 or the panel of the composite apparatus 104 as in the first embodiment, is analyzed by the protocol analyzer 303 and is transmitted to the job controller 304. At this point, the command is converted into a form understandable by the job controller 304.

Figure 15B:
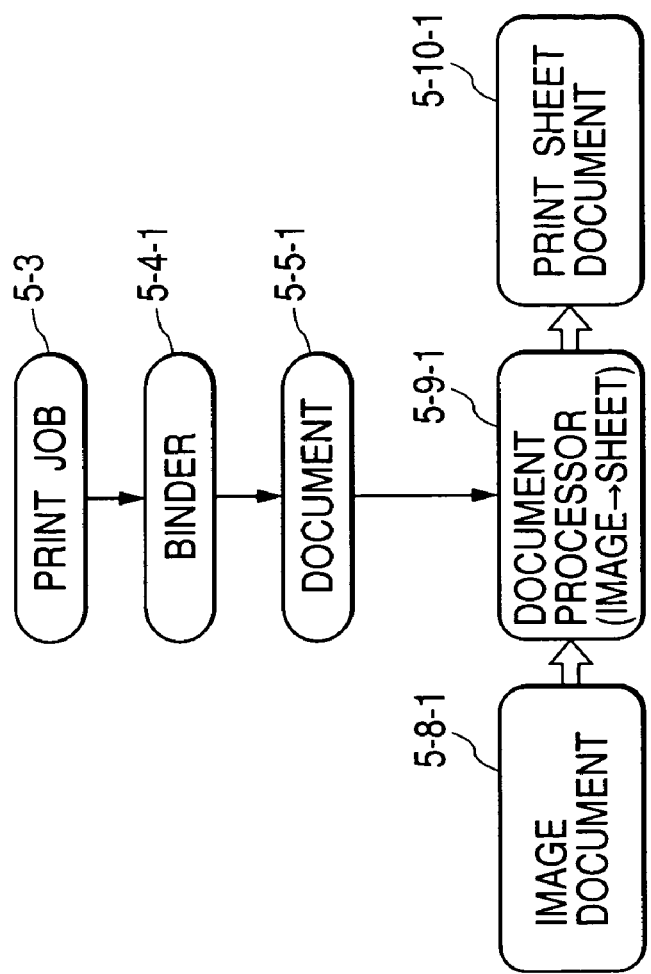
FIGS. 15A and 15B are views showing an example of job, binder and document execution processes in a job processor in a third embodiment of the present invention.
Figure 15A:
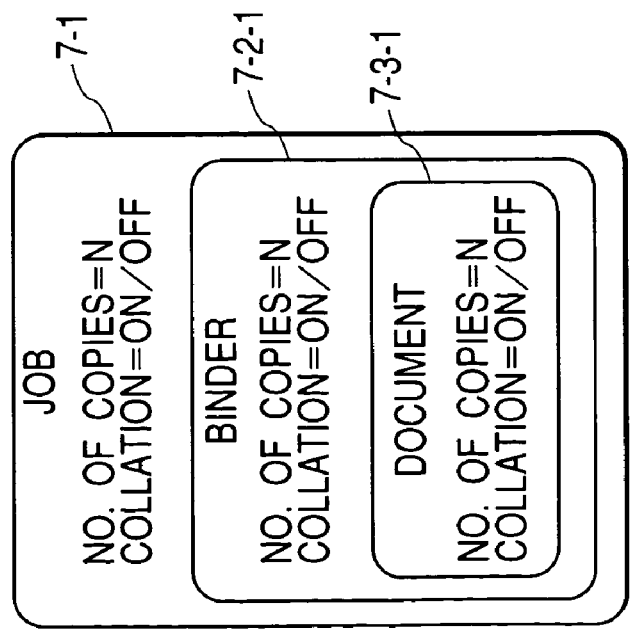

FIG. 15A shows a case where, as a result of analysis by the job processor 402, a job 7-1 includes a binder 7-2-1, which in turn includes a document 7-3-1. In each of the job 7-1, the binder 7-2-1 and the document 7-3-1, there can be set a number N of output copies and the order of output (collating on/off).

As shown in FIG. 15B, a print job 5-3 processes the output copy number N and the output order relating to the entire job, also generates a binder 5-4-1 constituting a smaller work unit and assigns other processes thereto. The binder 5-4-1 processes the output copy number N and the output order relating to the entire binder, also generates a document 5-5-1 constituting an even smaller work unit and assigns other processes thereto. The document 5-5-1 processes the output copy number N and the output order relating to the entire document, also generates a document processor (image→sheet) 5-9-1 and assigns other processes thereto. The document processor 5-9-1 converts an image document 5-8-1 constituting an input document into a print sheet document 5-10-1, thereby outputting a sheet.

Figure 16B:
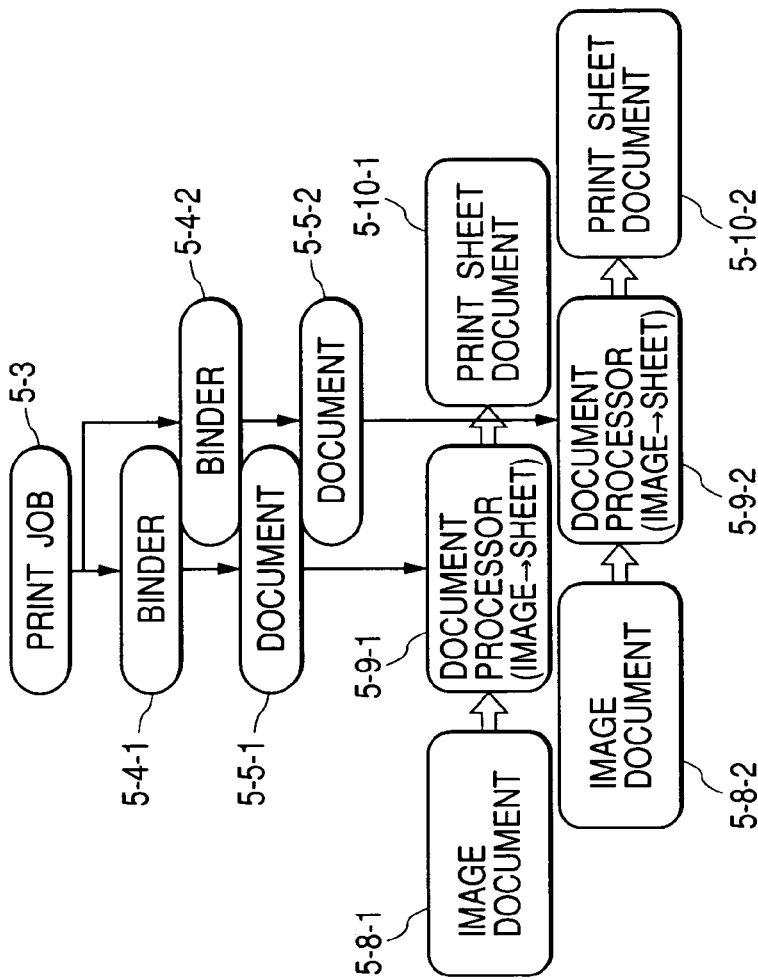
FIGS. 16A, 16B, 17A, 17B, 18A and 18B are views showing examples of job, binder and document execution processes in the job processor.
Figure 16A:
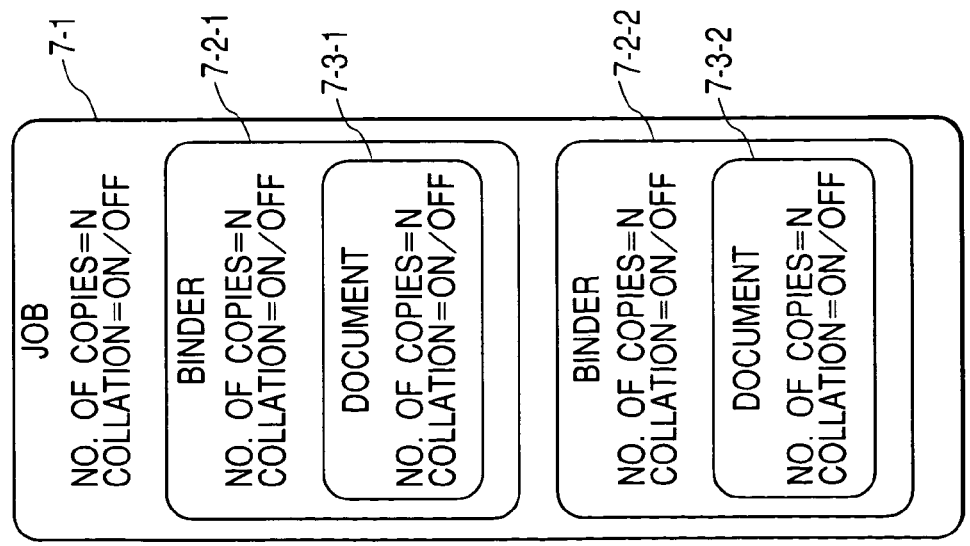

FIG. 16A shows a case where, as a result of analysis by the job processor 402, a job 7-1 includes two binders 7-2-1, 7-2-2 which respectively include documents 7-3-1, 7-3-2. In each of the job 7-1, the binders 7-2-1, 7-2-2 and the documents 7-3-1, 7-3-2, there can be set a number N of output copies and the order of output (collating on/off).

As shown in FIG. 16B, a print job 5-3 processes the output copy number N and the output order relating to the entire job, also generates a binder 5-4-1 constituting a smaller work unit and assigns other processes thereto. The binder 5-4-1 processes the output copy number N and the output order relating to the entire binder, also generates a document 5-5-1 constituting an even smaller work unit and assigns other processes thereto. The document 5-5-1 processes the output copy number N and the output order relating to the entire document, also generates a document processor (image→sheet) 5-9-1 and assigns other processes thereto. The document processor 5-9-1 converts an image document 5-8-1 constituting an input document into a print sheet document 5-10-1, thereby outputting a sheet.

Then the print job 5-3 generates a binder 5-4-2 and assigns the processes thereto. The binder 5-4-2 processes the output copy number N and the output order relating to the entire binder, also generates a document 5-5-2 constituting an even smaller work unit and assigns the processes thereto. The document 5-5-2 processes the output copy number N and the output order relating to the entire document, and assigns othere processes to a document processor (image→sheet) 5-9-2 constituting an even smaller work unit. The document processor 5-9-2 converts an image document 5-8-2 constituting an input document into a print sheet document 5-10-2, thereby outputting a sheet. FIG. 17A shows a case where, as a result of analysis by the job processor 402, a job 7-1 includes a binder 7-2-1, which includes two documents 7-3-1, 7-3-2. In each of the job 7-1, the binder 7-2-1 and the documents 7-3-1, 7-3-2, there can be set a number N of output copies and the order of output (collating on/off).

Figure 17B:
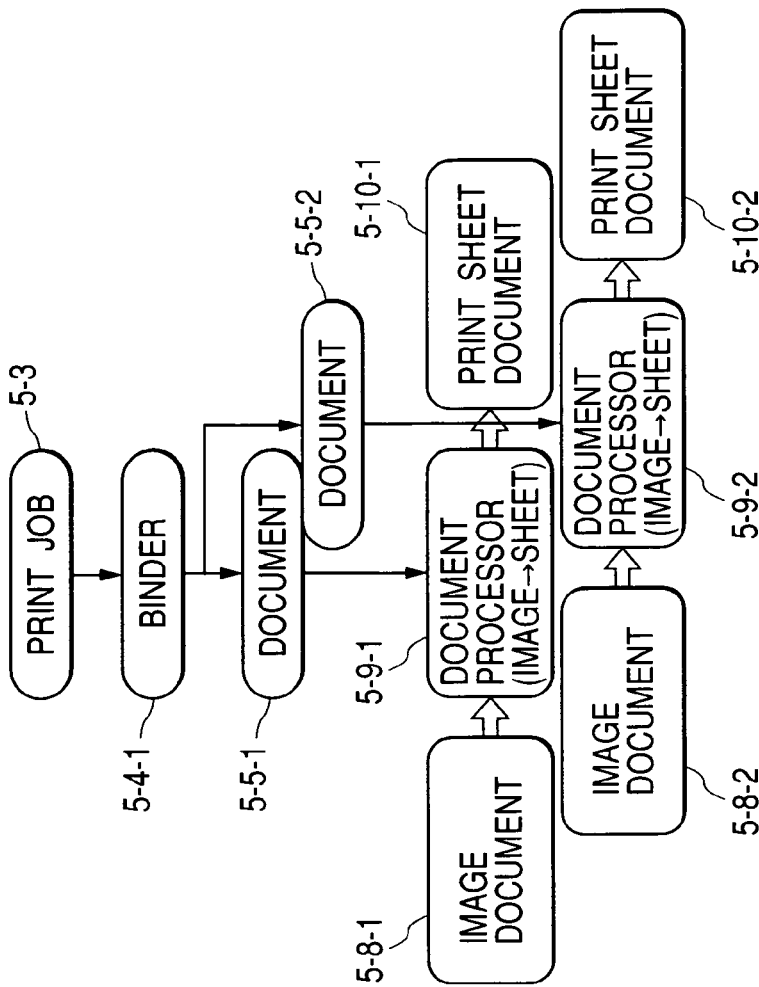
Figure 17A:
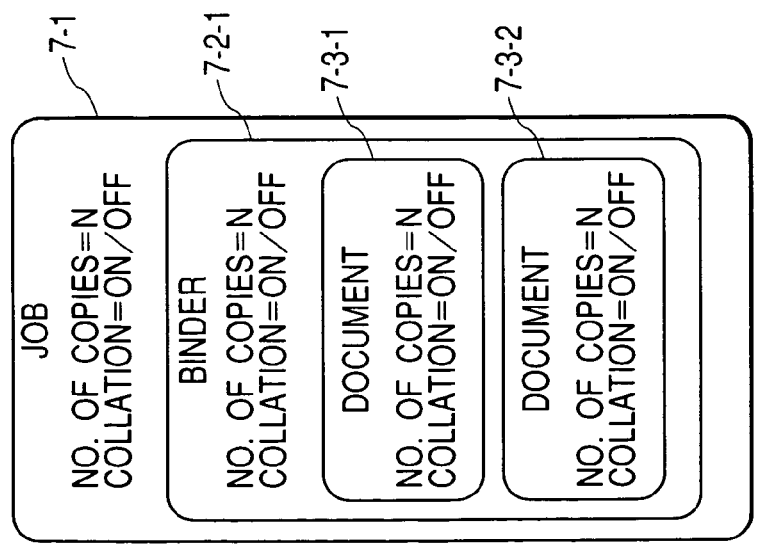

As shown in FIG. 17B, a print job 5-3 processes the output copy number N and the output order relating to the entire job, also generates a binder 5-4-1 constituting a smaller work unit and assigns other processes thereto. The binder 5-4-1 processes the output copy number N and the output order relating to the entire binder, also generates a document 5-5-1 constituting an even smaller work unit and assigns other processes thereto. The document 5-5-1 processes the output copy number N and the output order relating to the entire document, and assigns other processes to a document processor (image→sheet) 5-9-1 constituting an even smaller work unit. The document processor 5-9-1 converts an image document 5-8-1 constituting an input document into a print sheet document 5-10-1, thereby outputting a sheet.

Then the binder 5-4-1 generates a document 5-5-2 constituting an even smaller work unit and assigns the processes thereto. The document 5-5-2 processes the output copy number N and the output order relating to the entire document, and assigns other processes to a document processor (image→sheet) 5-9-2 constituting an even smaller work unit. The document processor 5-9-2 converts an image document 5-8-2 constituting an input document into a print sheet document 5-10-2, thereby outputting a sheet.

Figure 18B:
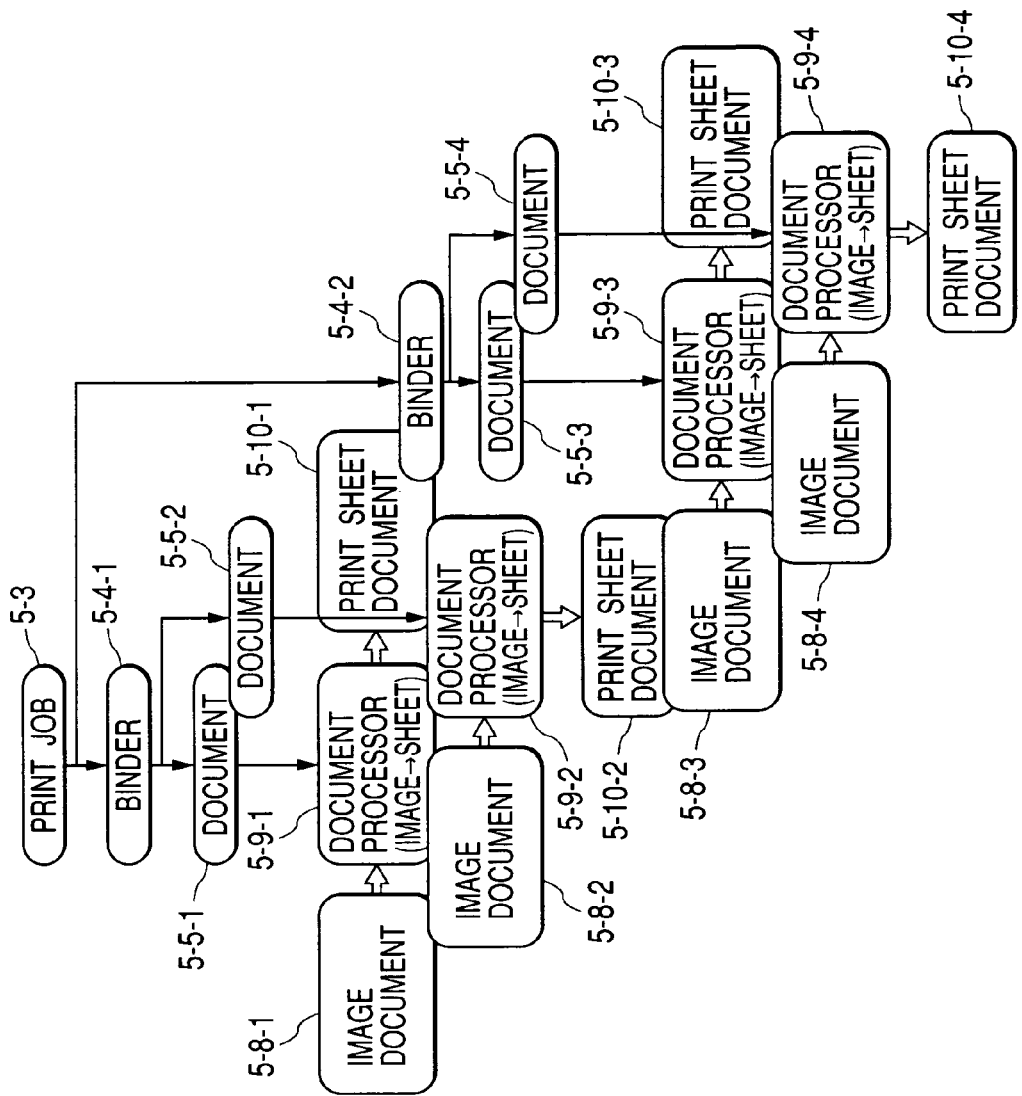
Figure 18A:
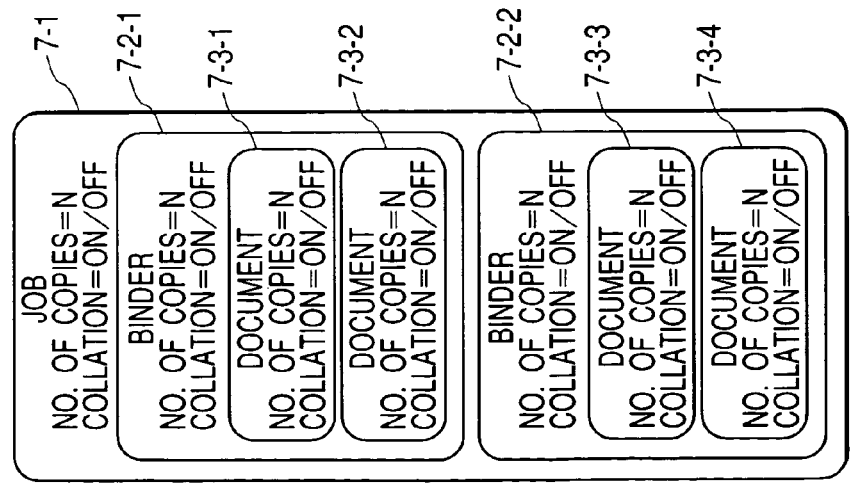

FIG. 18A shows a case where, as a result of analysis by the job processor 402, a job 7-1 includes two binders 7-2-1, 7-2-2 in which the binder 7-2-1 includes two documents 7-3-1, 7-3-2, and the binder 7-2-2 includes two documents 7-3-3, 7-3-4. In each of the job 7-1, the binders 7-2-1, 7-2-2 and the documents 7-3-1, 7-3-2, 7-3-3, 7-3-4, there can be set a number N of output copies and the order of output (collating on/off).

As shown in FIG. 18B, a print job 5-3 processes the output copy number N and the output order relating to the entire job, also generates a binder 5-4-1 constituting a smaller work unit and assigns other processes thereto. The binder 5-4-1 processes the output copy number N and the output order relating to the entire binder, also generates a document 5-5-1 constituting an even smaller work unit and assigns other processes thereto. The document 5-5-1 processes the output copy number N and the output order relating to the entire document, and assigns other processes to a document processor (image→sheet) 5-9-1 constituting an even smaller work unit. The document processor 5-9-1 converts an image document 5-8-1 constituting an input document into a print sheet document 5-10-1, thereby outputting a sheet.

Then the binder 5-4-1 generates a document 5-5-2 constituting an even smaller work unit and assigns the processes thereto. The document 5-5-2 processes the output copy number N and the output order relating to the entire document, and assigns other processes to a document processor (image sheet) 5-9-2 constituting an even smaller work unit. The document processor 5-9-2 converts an image document 5-8-2 constituting an input document into a print sheet document 5-10-2, thereby outputting a sheet.

Then the print job 5-3 generates a binder 5-4-2 and assigns the processes thereto. The binder 5-4-2 processes the output copy number N and the output order relating to the entire binder, also generates a document 5-5-3 constituting an even smaller work unit and assigns other processes thereto. The document 5-5-3 processes the output copy number N and the output order relating to the entire document, and assigns other processes to a document processor (image→sheet) 5-9-3 constituting an even smaller work unit. The document processor 5-9-3 converts an image document 5-8-3 constituting an input document into a print sheet document 5-10-3, thereby outputting a sheet. Then the binder 5-4-2 generates a document 5-5-4 constituting an even smaller work unit and assigns the processes thereto. The document 5-5-4 processes the output copy number N and the output order relating to the entire document, and assigns other processes to a document processor (image→sheet) 5-9-4 constituting an even smaller work unit. The document processor 5-9-4 converts an image document 5-8-4 constituting an input document into a print sheet document 5-10-4, thereby outputting a sheet.

The above-described procedure enables operations corresponding to various combinations of the binder 414 and the document 415 constituting the job 413, thereby enabling the output in various forms.

FIGS. 19A to 19C and 20A to 20C are views showing examples of an output copy number/output order execution process executed by the job.

FIG. 19A shows a case where the job includes two binders and there are set, for the job, conditions of output copy number=2 and collation=off.

At first, as shown in FIG. 19B, the print job generates a first binder 1-1 (8-1), and instructs the generated binder 1-1 to start the process (8-2). When the process comes close to the end, the binder 1-1 informs the print job of the end of process in advance (8-3). In response, the print job generates a binder 1-2 which is a copy of the first binder 1-1, since the collation=off is selected in this case (8-4). Then the generated binder 1-2 is given an instruction to start the process (8-5). When the process comes close to the end, the binder 1-2 informs the print job of the end of process in advance (8-6). As the process is thus completed for the output copy number (=2) set for the first binder, the process is transferred to the second binder.

Then, having received the information for the end of process from the binder 1-2, the print job generates a second binder 2-1 (8-7), and instructs the generated binder 2-1 to start the process (8-8). When the process comes close to the end, the binder 2-1 informs the print job of the end of process in advance (8-9). In response, the print job generates a binder 2-2 which is a copy of the second binder 2-1, since the collation=off is selected in this case (8-10). Then the generated binder 2-2 is given an instruction to start the process (8-11). When the process comes close to the end of process, the binder 2-2 informs the print job of the end of process in advance (8-12). As the process is thus completed for the output copy number (=2) set for the second binder, the process proceeds to a succeeding stage.

The contents set in the job are executed in succession by the repetition of the above-described process. The obtained results are outputted in the order of the binder 1-1, the binder 1-2, the binder 2-1 and the binder 2-2 as shown in FIG. 19C.

FIG. 20A shows a case where the job includes two binders and there are set, for the job, conditions of output copy number=2 and collation=on.

At first, as shown in FIG. 20B, the print job generates a first binder 1-1 (9-1), and instructs the generated binder 1-1 to start the process (9-2). When the process comes close to the end, the binder 1-1 informs the print job of the end of process in advance (9-3). In response, the print job transfers the process to the second binder, since the collation=on is selected in this case. More specifically, there is generated a second binder 2-1 (9-4), and the generated binder 2-1 is given an instruction to start the process (9-5). When the process comes close to the end, the binder 2-1 informs the print job of the end of process in advance (9-6). As the process is thus completed for the first copy of all the binders in the job, there is executed the process for the set output copy number.

At first, there is generated a binder 1-2 which is a copy of the first binder 1-1 (9-7), and the generated binder 1-2 is given an instruction to start the process (9-8). When the process comes close to the end, the binder 1-2 informs the print job of the end of process in advance (9-9). Having received the information for the end of process from the binder 1-2, the print job transfers the process to the second binder since the collation=on is selected in this case. More specifically, there is generated a binder 2-2 which is a copy of the second binder 2-1 (9-10), and the generated binder 2-2 is given an instruction to start the process (9-11). When the process comes close to the end, the binder 2-2 informs the print job of the end of process in advance (9-12). Since the process is thus completed for the output copy number set for all the binders, the process proceeds to a succeeding stage.

The contents set in the job are executed in succession by the repetition of the above-described process. The obtained results are outputted in the order of the binder 1-1, the binder 1-2, the binder 2-1 and the binder 2-2 as shown in FIG. 20C.

FIGS. 21A to 21C and 22A to 22C are views showing examples of an output copy number/output order execution process executed by the binder.

FIG. 21A shows a case where the job includes a binder which includes two documents, and there are set, for the job, conditions of output copy number=2 and collation=off.

At first, as shown in FIG. 21B, the print job generates a binder (10-1), and instructs the generated binder to start the process (10-2). The binder generates a first document 1-1 (10-3) and instructs the generated document 1-1 to start the process (10-4). When the process comes close to the end, the document 1-1 informs the binder of the end of process in advance (10-5). In response, the binder generates a document 1-2 which is a copy of the first document 1-1, since the collation=off is selected in this case (10-6). Then the generated document 1-2 is given an instruction to start the process (10-7). When the process comes close to the end, the document 1-2 informs the binder of the end of process in advance (10-8). As the process is thus completed for the output copy number (=2) set for the first document, the process is transferred to the second document.

Then, having received the information for the end of process from the document 1-2, the binder generates a second document 2-1 (10-9), and instructs the generated document 2-1 to start the process (10-10). When the process comes close to the end, the document 2-1 informs the binder of the end of process in advance (10-11). In response, the binder generates a document 2-2 which is a copy of the second document 2-1, since the collation=off is selected in this case (10-12). Then the generated document 2-2 is given an instruction to start the process (10-13). When the process comes close to the end, the document 2-2 informs the binder of the end of process in advance (10-14). As the process is thus completed for the output copy number (=2) set for the second document, the process proceeds to a succeeding stage.

The contents set in the binder are executed in succession by the repetition of the above-described process. The obtained results are outputted in the order of the document 1-1, the document 1-2, the document 2-1 and the document 2-2 as shown in FIG. 21C.

FIG. 22A shows a case where the job includes a binder which includes two documents and there are set, for the job, conditions of output copy number=2 and collation=on.

At first, the print job generates a binder (11-1), and instructs the generated binder to start the process (11-2). The binder generates a first document 1-1 (11-3) and instructs the generated document 1-1 to start the process (11-4). When the process comes close to the end, the document 1-1 informs the binder of the end of process in advance (11-5). In response, the binder transfers the process to the second document, since the collation=on is selected in this case. More specifically, there is generated a second document 2-1 (11-6), and the generated document 2-1 is given an instruction to start the process (11-7). When the process comes close to the end, the document 2-1 informs the binder of the end of process in advance (11-8). As the process is thus completed for the first copy for all the documents contained in the binder, there is executed the process for the set output copy number.

More specifically, there is generated a document 1-2 which is a copy of the first document 1-1 (11-9), and the generated document 1-2 is given an instruction to start the process (11-10). When the process comes close to the end, the document 1-2 informs the binder of the end of process in advance (11-11). Having received the information for the end of process from the document 1-2, the binder transfers the process to the second document, since the collation=on is selected in this case. More specifically, there is generated a document 2-2 which is a copy of the second document 2-1 (11-12), and the generated document 2-2 is given an instruction to start the process (11-13). When the process comes close to the end, the document 2-2 informs the binder of the end of process in advance (11-14). As the process is thus completed for the output copy number set for all the documents, the process proceeds to a succeeding stage.

The contents set in the job are executed in succession by the repetition of the above-described process. The obtained results are outputted in the order of the document 1-1, the document 1-2, the document 2-1 and the document 2-2 as shown in FIG. 20C.

FIGS. 23A to 23C and 24A to 24C are views showing examples of an output copy number/output order execution process executed by the document.

FIG. 23A shows a case where the job includes a binder which includes a document, and there are set, for the document, conditions of output copy number=2 and collation=off.

At first, as shown in FIG. 23B, the print job generates a binder (12-1), and instructs the generated binder to start the process (12-2). The binder generates a document (12-3) and instructs the generated document to start the process (12-4). The document generates a first document processor 1-1 (12-5), and instructs the generated document processor 1-1 to start the process (12-6). When the process comes close to the end, the document processor 1-1 informs the document of the end of process in advance (12-7). In response, the document generates a document processor 1-2 which is a copy of the first document processor 1-1, since the collation=off is selected in this case (12-8). Then the generated document processor 1-2 is given an instruction to start the process (12-9). When the process comes close to the end, the document processor 1-2 informs the document of the end of process in advance (12-10). As the process is thus completed for the output copy number (=2) set for the first document processor, the process is transferred to the second document processor.

Then, having received the information for the end of process from the document processor 1-2, the document generates a second document processor 2-1 (12-11), and instructs the generated document processor 2-1 to start the process (12-12). When the process comes close to the end, the document processor 2-1 informs the document of the end of process in advance (12-13). In response, the document generates a document processor 2-2 which is a copy of the second document processor 2-1, since the collation=off is selected in this case (12-14). Then the generated document processor 2-2 is given an instruction to start the process (12-15). When the process comes close to the end, the document processor 2-2 informs the document of the end of process in advance (12-16). As the process is thus completed for the output copy number (=2) set for the second document processor, the process proceeds to a succeeding stage.

The contents set in the document are executed in succession by the repetition of the above-described process. The obtained results are outputted in the order of a page 1, a page 1 a page 2 and a page 2 as shown in FIG. 23C.

Figure 24A:
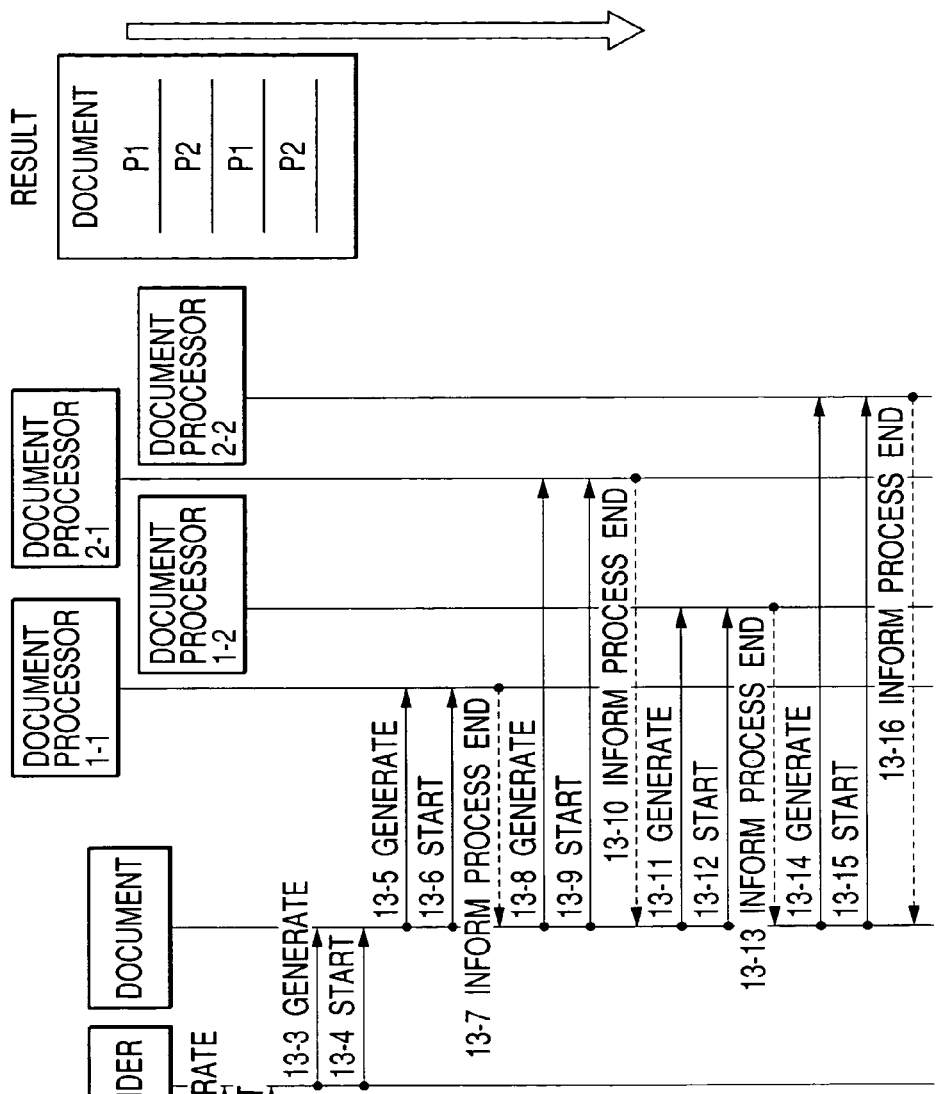

FIG. 24A shows a case where the job includes a binder which includes a document and there are set, for the document, conditions of output copy number=2 and collation=on.

Figure 24B:
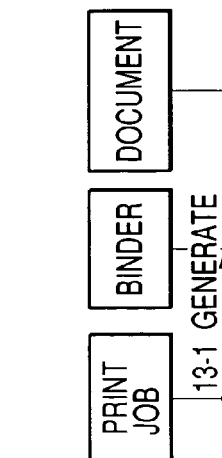

At first, as shown in FIG. 24B, the print job generates a binder (13-1), and instructs the generated binder to start the process (13-2). The binder generates a document (13-3) and instructs the generated document to start the process (13-4). The document generates a first document processor 1-1 (13-5) and instructs the generated document processor 1-1 to start the process (13-6). When the process comes close to the end, the document processor 1-1 informs the document of the end of process in advance (13-7). In response, the document transfers the process to the second document processor, since the collation=on is selected in this case. More specifically, there is generated a second document processor 2-1 (13-8), and the generated document processor 2-1 is given an instruction to start the process (13-9). When the process comes close to the end, the document processor 2-1 informs the document of the end of process in advance (13-10). As the process is thus completed for the first copy of all the document processors, there is then executed the process for the set output copy number.

More specifically, there is generated a document processor 1-2 which is a copy of the first document processor 1-1 (13-11), and the generated document processor 1-2 is given an instruction to start the process (13-12). When the process comes close to the end, the document processor 1-2 informs the document of the end of process in advance (13-13). Having received the information for the end of process from the document processor 1-2, the document transfers the process to the second document processor, since the collation=on is selected in this case. More specifically, there is generated a document processor 2-2 which is a copy of the second document processor 2-1 (13-14), and the generated document processor 2-2 is given an instruction to start the process (13-15). When the process comes close to the end, the document processor 2-2 informs the document of the end of process in advance (13-16). Since the process is thus completed for the output copy number set for all the documents, the process proceeds to a succeeding stage.

Figure 24C:
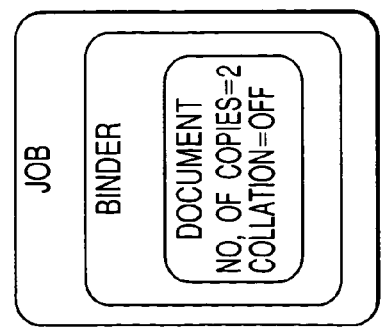

The contents set in the document are executed in succession by the repetition of the above-described process. The obtained results are outputted in the order of a page 1, a page 1, a page 2 and a page 2 as shown in FIG. 24C.

The present embodiment not only provides effects similar to those of the first embodiment but also enables, through various combinations of the setting and process, finer setting on the order of output in outputting plural document in a job.

<Fourth Embodiment>

In the following there will be explained a fourth embodiment of the present invention with reference to FIGS. 25A to 31B. In the present embodiment, the information processing system is same in the basic configuration and processes as that in the foregoing first embodiment shown in FIGS. 1 to 7, and will therefore be explained with reference to these drawings wherever necessary.

FIGS. 25A, 25B, 26A, 26B, 27A, 27B, 28A and 28B =are views showing examples of the execution process of a job 413, a binder 414 and a document 415 in the job processor 402. These drawings show the configuration of the input document 416 and the output document 419 under the control of the job manager 403.

A command which is a request for a series of operations, transmitted from the host computer 101, 102 or 103 or the panel of the composite apparatus 104 as in the first embodiment, is analyzed by the protocol analyzer 303 and is transmitted to the job controller 304. At this point, the command is converted into a form understandable by the job controller 304.

Figure 25B:
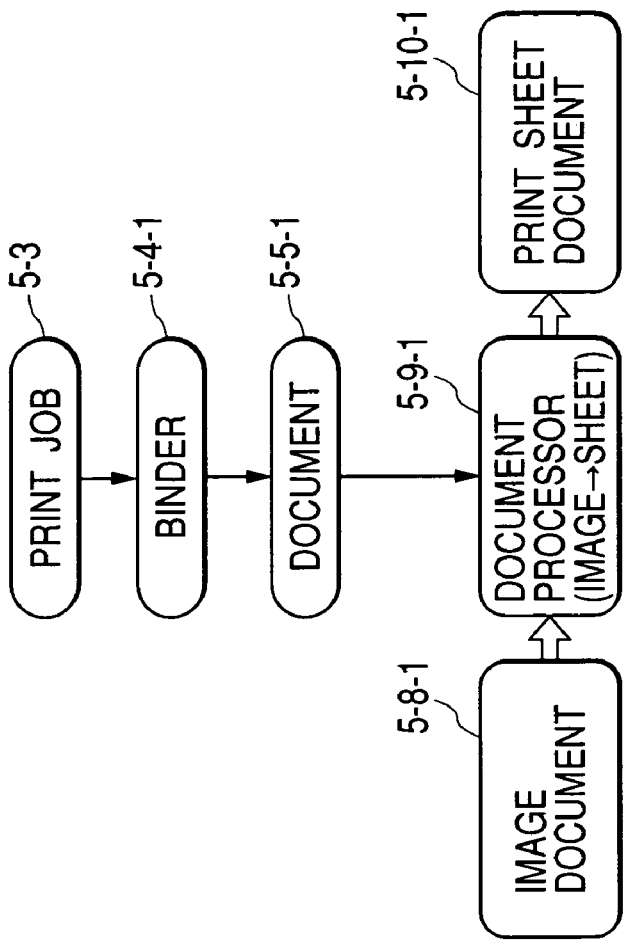
FIGS. 25A and 25B are views showing an example of job, binder and document execution processes in a job processor in a fourth embodiment of the present invention.
Figure 25A:
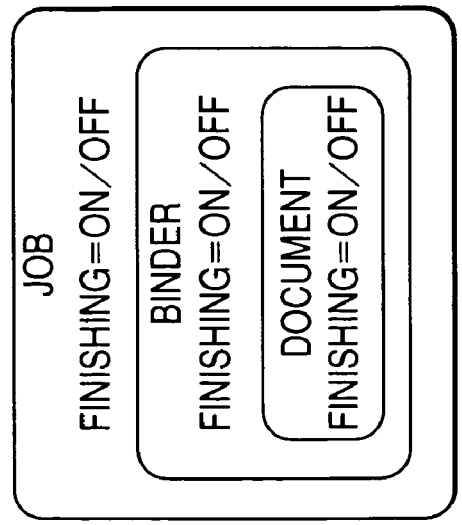

FIG. 25A shows a case where, as a result of analysis by the job processor 402, a job includes a binder, which in turn includes a document. In each of the job, the binder and the document, there can be set finishing (stapled sorting, shift sorting, rotated sorting etc.).

The process flow shown in FIG. 25B is similar to that in the first embodiment (FIG. 8B). However, the designation of finishing is processed in the following manner. In case a finishing is designated for the job, the print job 5-3 invalidates the designation of finishing in the binder 5-4-1 or the document 5-5-1 ranked below the print job. Also in case a finishing is designated for the binder, the binder 5-4-1 invalidates the designation of finishing in the document 5-5-1 raned below the binder.

Figure 26B:
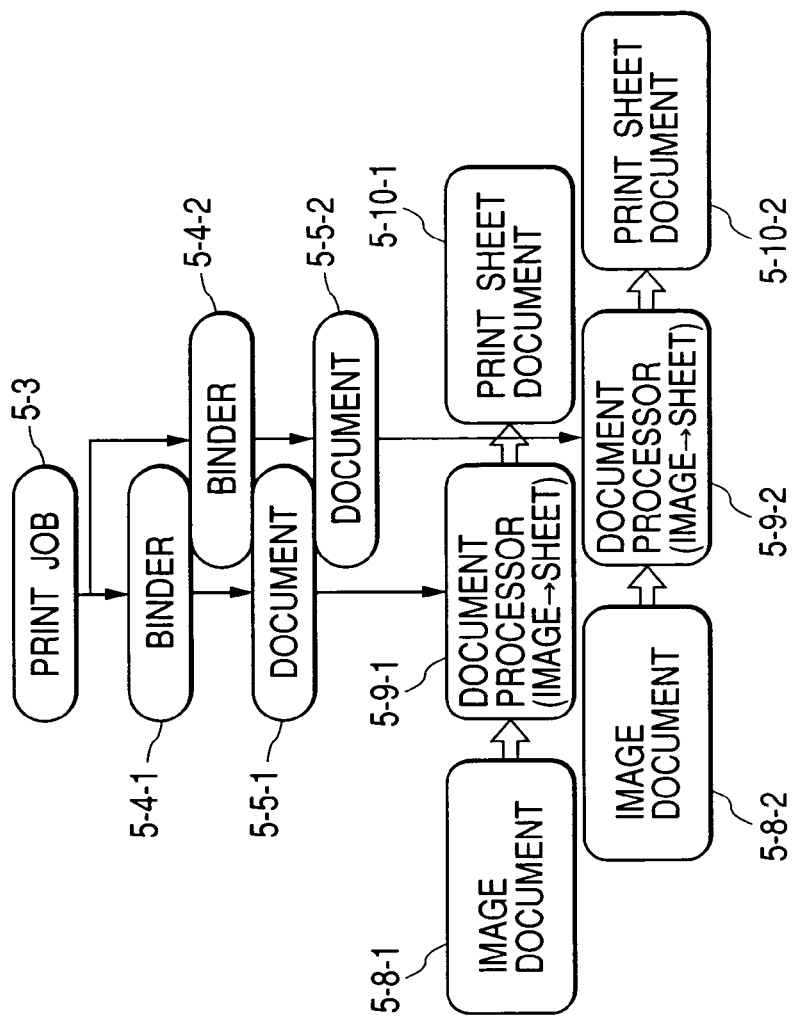
FIGS. 26A and 26B are views showing an example of job, binder and document execution processes in a job processor in a fourth embodiment of the present invention.
Figure 26A:
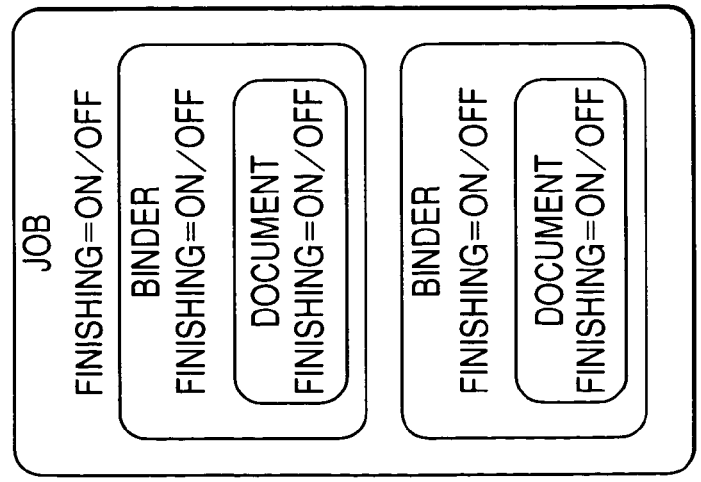

FIG. 26A shows a case where, as a result of analysis by the job processor 402, a job includes two binders each of which includes a document. In each of the job, the binders and the documents, there can be designated a finishing.

The process flow shown in FIG. 26B is similar to that in the first embodiment (FIG. 9B). However, the designation of finishing is rendered effective only in the highest level as in the case of FIGS. 25A and 25B. More specifically, in case a finishing is designated for the job, the print job 5-3 invalidates the designation of finishing in the binders 5-4-1, 5-4-2 or the documents 5-5-1, 5-5-2 ranked below the print job. Also in case a finishing is designated for the binder, the binders 5-4-1, 5-4-2 invalidate the designation of finishing in the documents 5-5-1, 5-5-2 ranked below the binder.

Figure 27B:
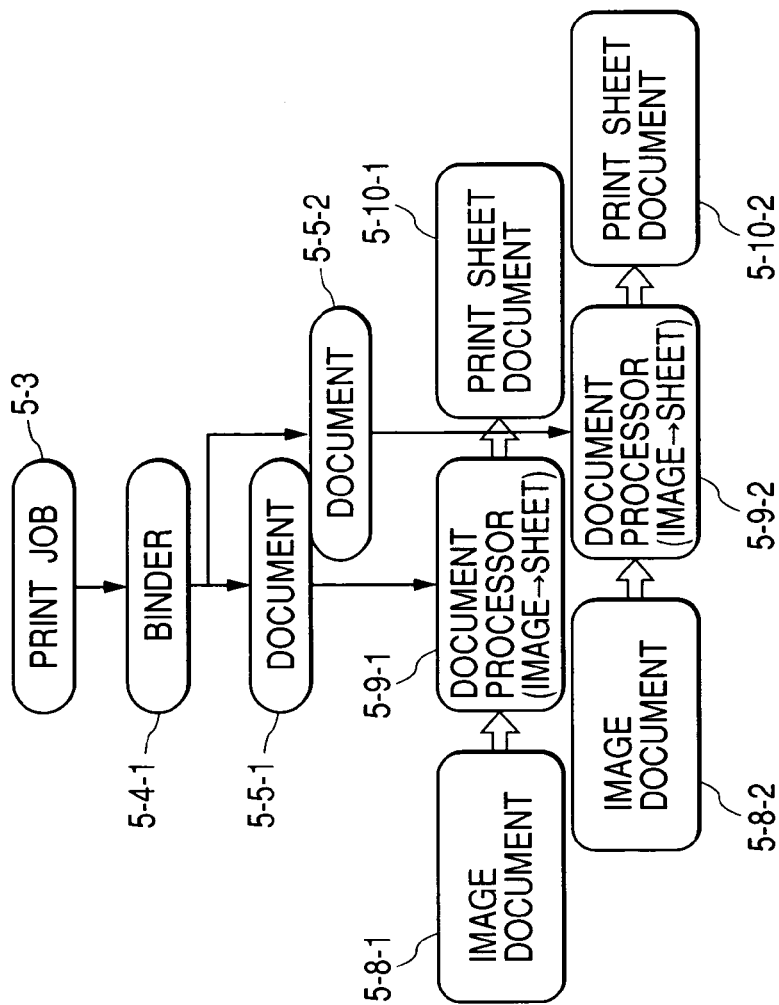
FIGS. 27A, 27B, 28A and 28B are views showing examples of job, binder and document execution processes in the job processor.
Figure 27A:
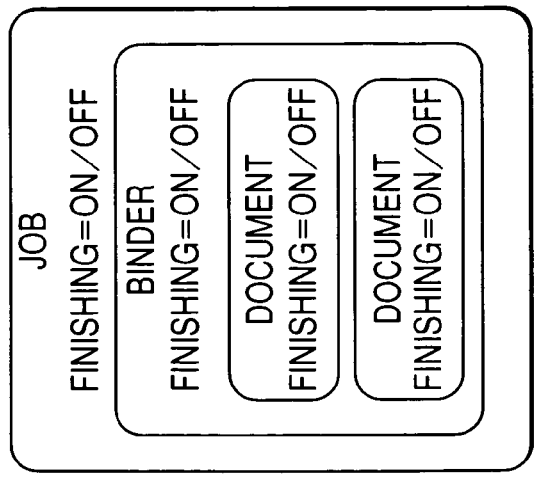

FIG. 27A shows a case where, as a result of analysis by the job processor 402, a job includes a binder which includes two documents. In each of the job, the binder and the documents, there can be designated a finishing.

The process flow shown in FIG. 27B is similar to that in the first embodiment (FIG. 10B). However, the designation of finishing is made effective only in the highest level as in the case of FIGS. 25A and 25B. More specifically, in case a finishing is designated for the job, the print job 5-3 invalidates the designation of finishing in the binder 5-4-1 or the documents 5-5-1, 5-5-2 ranked below the print job. Also in case a finishing is designated for the binder, the binder 5-4-1 invalidates the designation of finishing in the documents 5-5-1, 5-5-2 ranked below the binder.

Figure 28B:
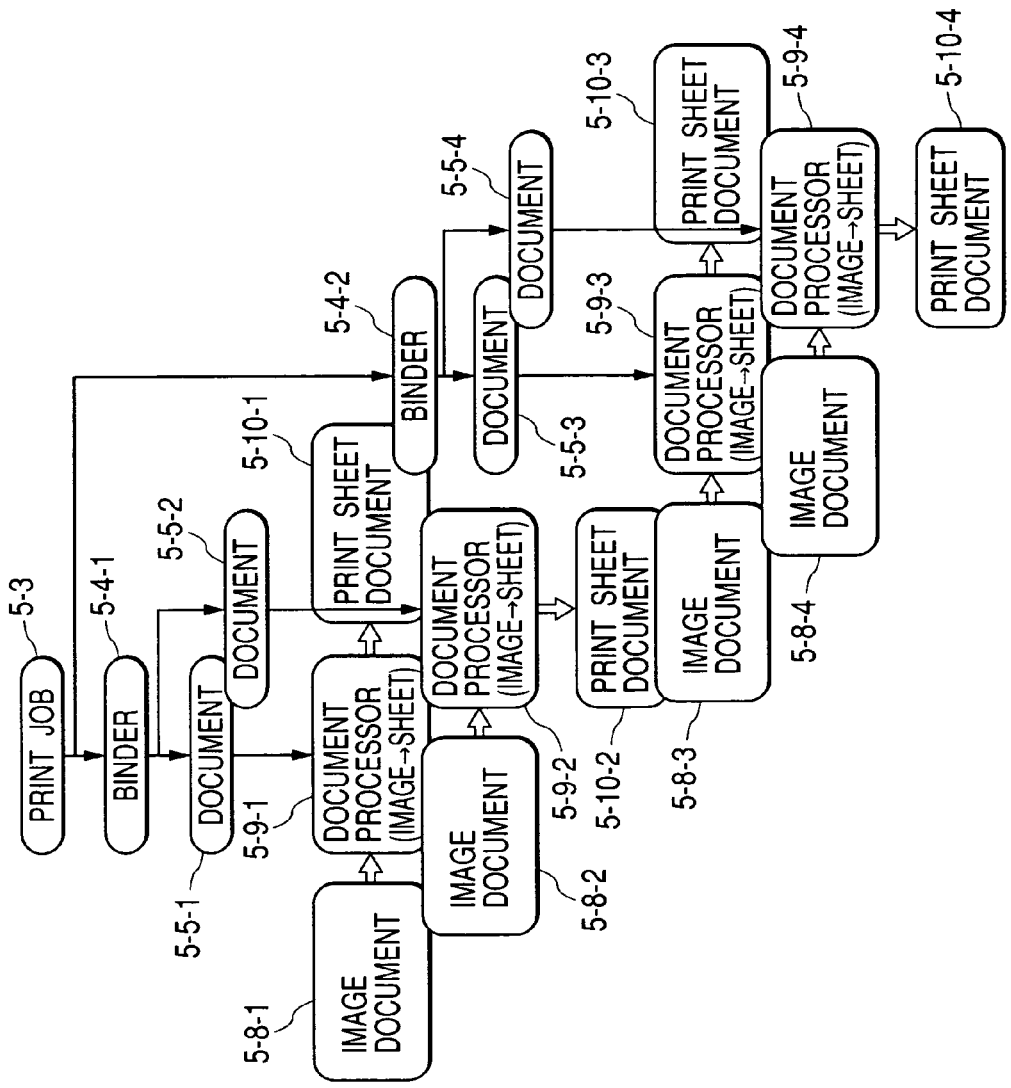
Figure 28A:
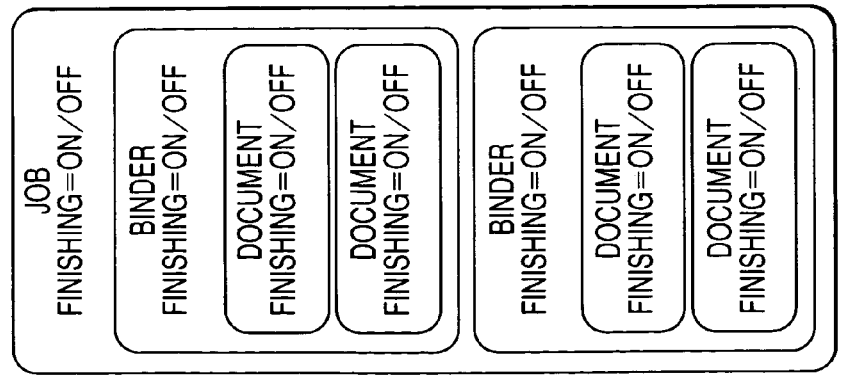

FIG. 28A shows a case where, as a result of analysis by the job processor 402, a job includes two binders each of which includes two documents. In each of the job, the binders and the documents, there can be designated a finishing.

The process flow shown in FIG. 28B is similar to that in the first embodiment (FIG. 11B). However, the designation of finishing is made effective only in the highest level as in the case of FIGS. 25A and 25B. More specifically, in case a finishing is designated for the job, the print job 5-3 invalidates the designation of finishing in the binders 5-4-1, 5-4-2 or the documents 5-5-1, 5-5-2, 5-5-3, 5-5-4 ranked below the print job. Also in case a finishing is designated for the binder, the binder 5-4-1 invalidates the designation of finishing in the documents 5-5-1, 5-5-2 ranked below the binder, and the binder 5-4-2 invalidates the designation of finishing in the documents 5-5-3, 5-5-4 ranked below the binder.

The above-described procedures enable operations corresponding various combinations of the binder 414 and the document 415 constituting the job 413, thereby enabling output in various forms.

Figure 29B:
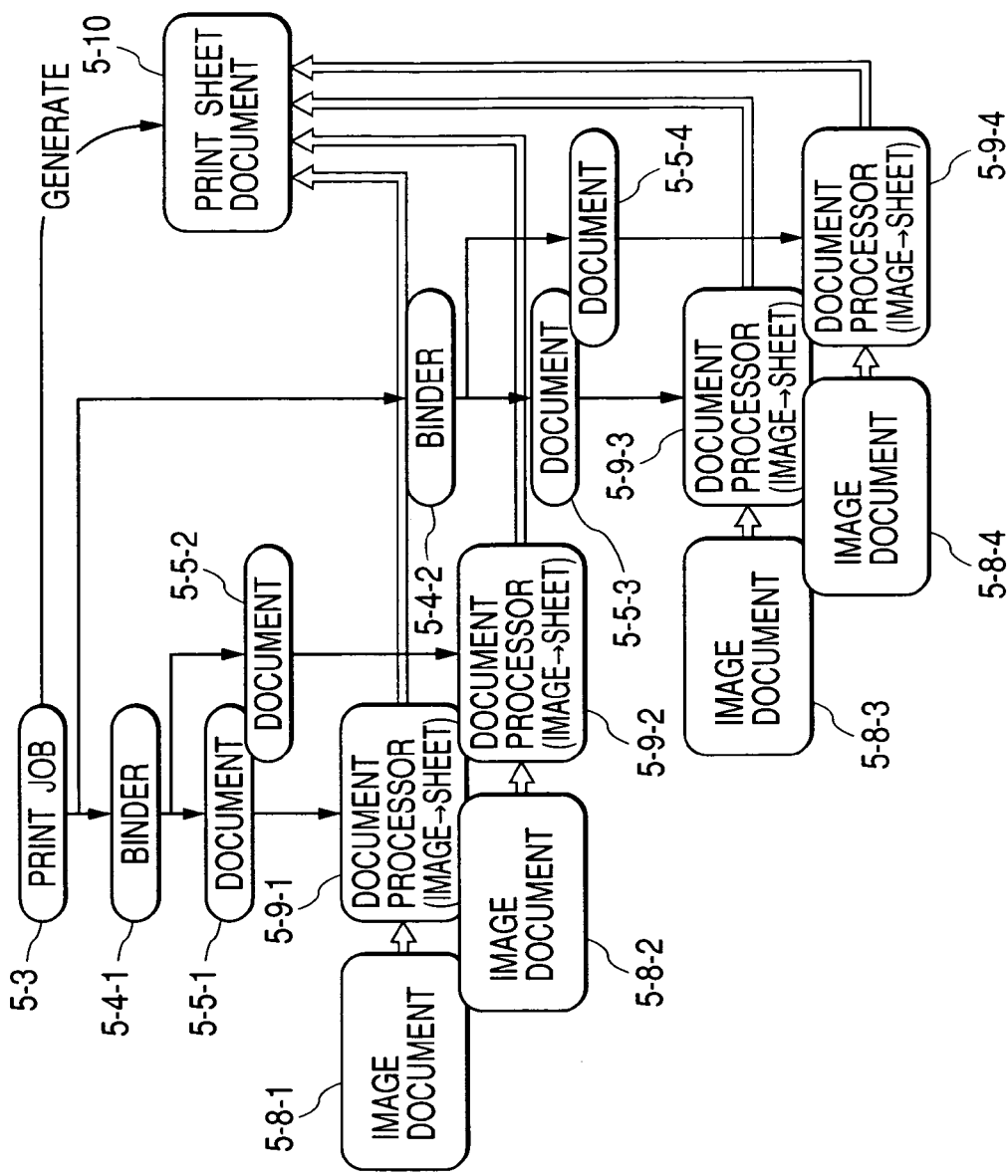
FIGS. 29A and 29B are views showing an example of an execution process in case finishing is set in a job.
Figure 29A:
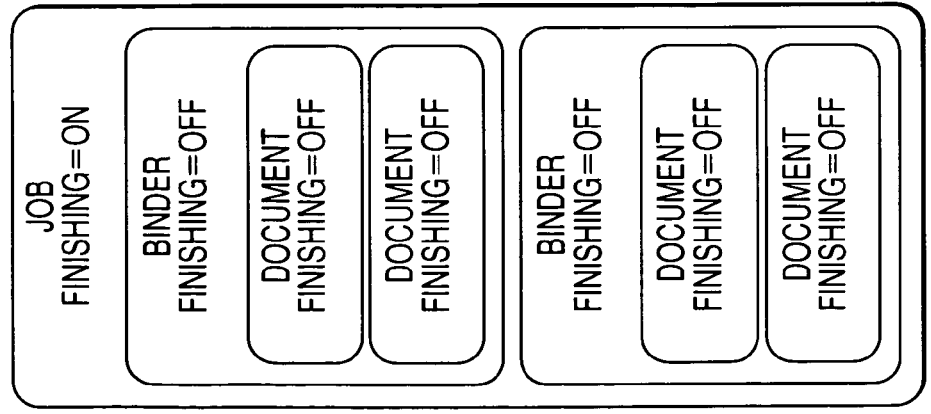
Figure 30B:
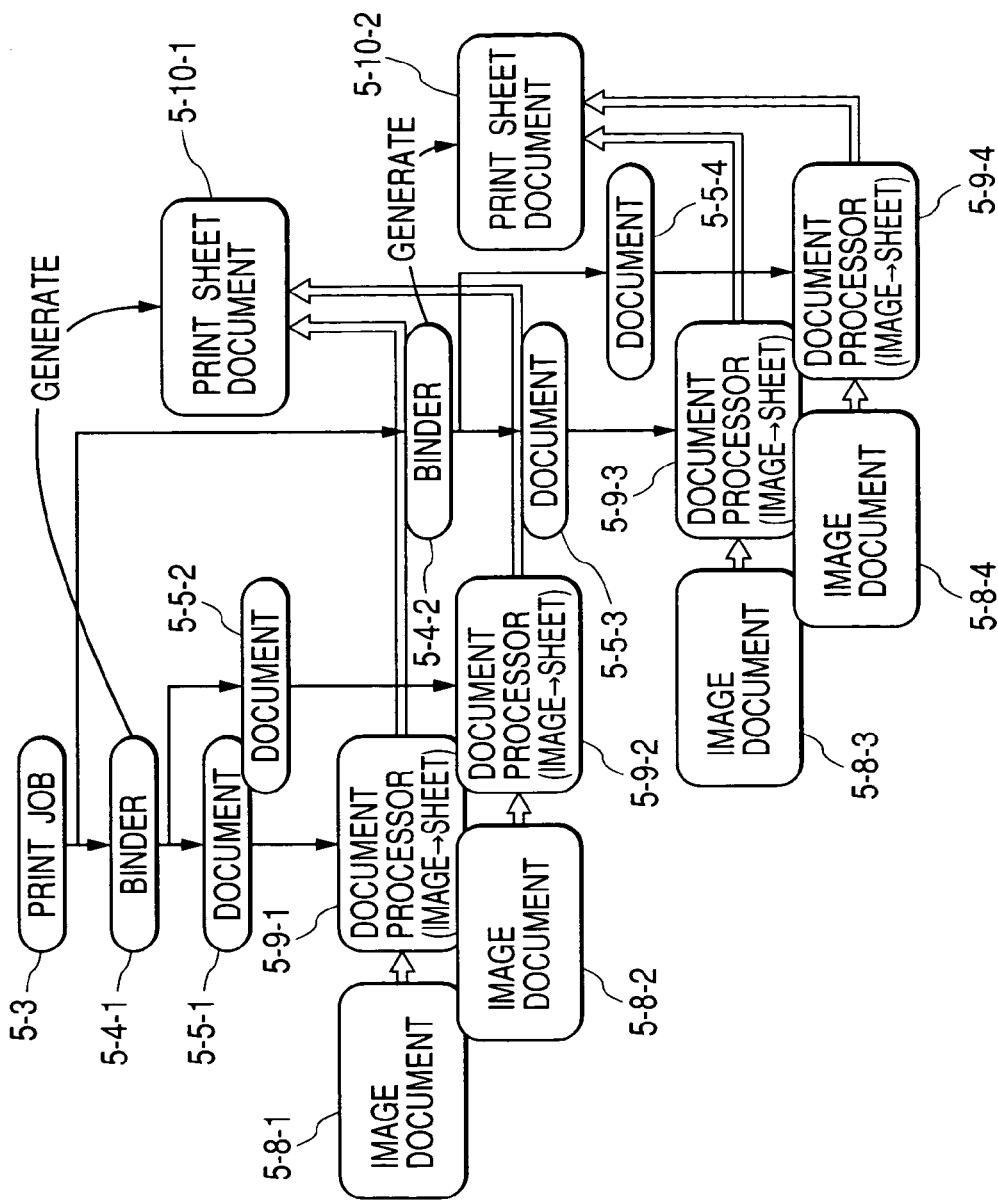
FIGS. 30A and 30B are views showing an example of an execution process in case finishing is set in a binder.
Figure 30A:
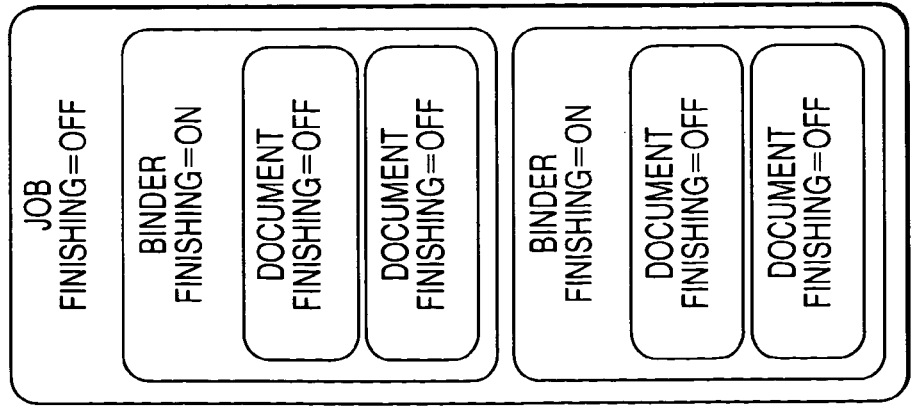
Figure 31B:
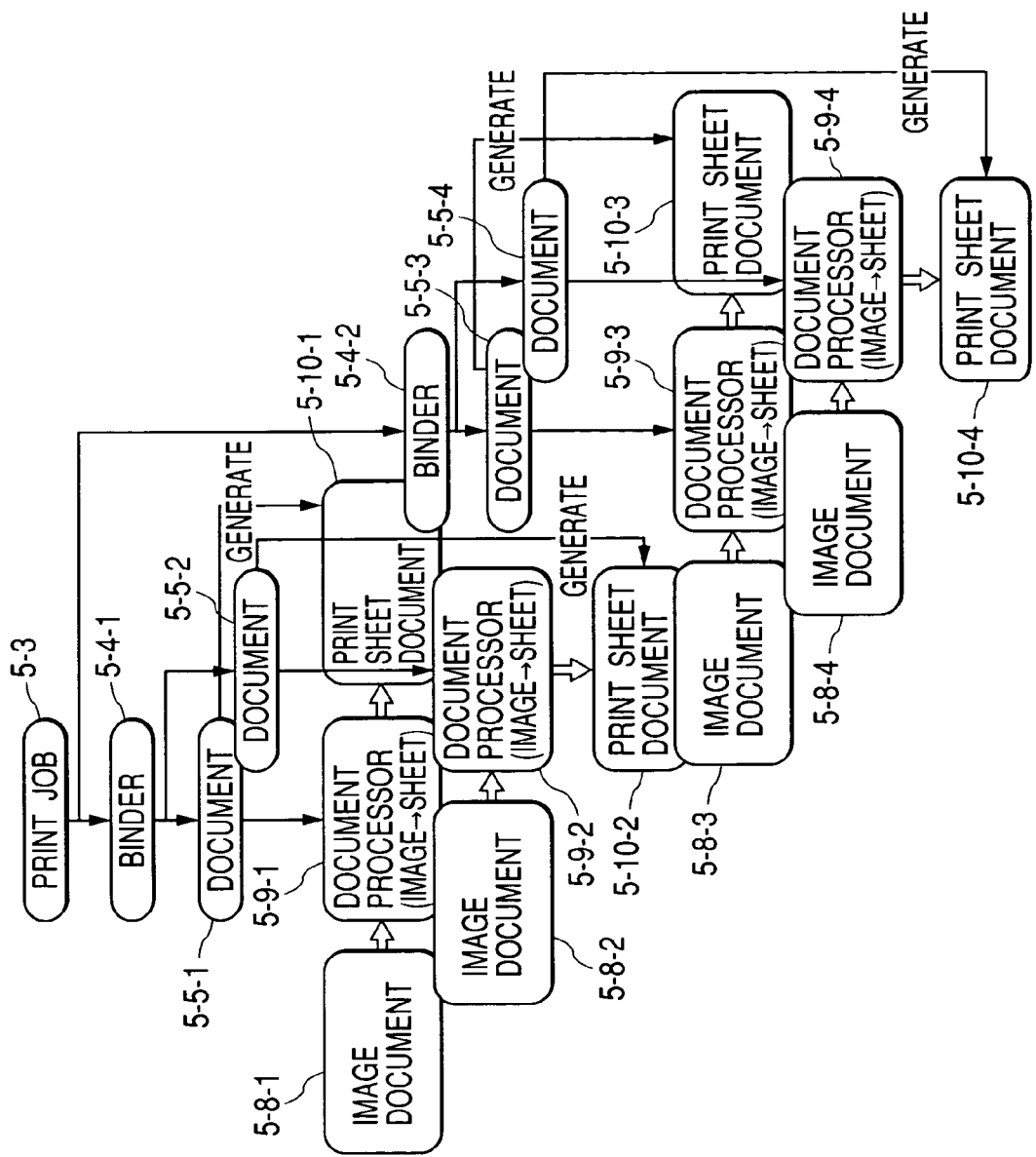
FIGS. 31A and 31B are views showing an example of an execution process in case finishing is set in a document.
Figure 31A:
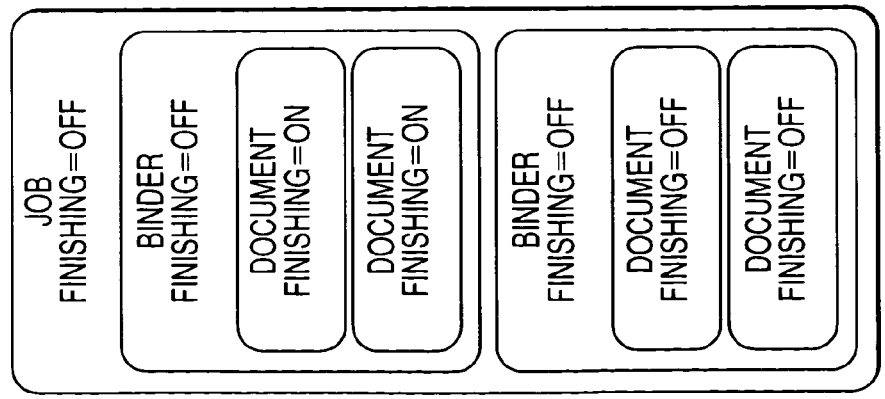

FIGS. 29A, 29B, 30A, 30B, 31A and 31B are views showing examples of the execution process when the finishing is designated. FIGS. 29A, 30A and 31A show a case where a job includes two binders each of which includes two documents. These drawings show the configuration of the input document 416 and the output document 419 under the control of the job manager 403.

FIGS. 29A and 29B show an example of the execution process in case a finishing is set in the job.

As shown in FIG. 29B, the print job 5-3, upon detecting the setting of a finishing on the job, generates a print sheet document 5-10 constituting an output document. It also generates a binder 5-4-1 constituting a smaller work unit and assigns thereto other processes. In this operation, since the finishing is designated on the job, the print job so functions as to invalidate the designation finishing on the binder and on the document. Also the print job informs the binder 5-4-1 of the generated print sheet document 5-10.

The binder 5-4-1 processes the setting on itself, also generates a document 5-5-1 constituting an even smaller work unit and assigns thereto other processes. In this operation, since the finishing is designated on the job, the binder so functions as to invalidate the finishing designation on the document. The binder 5-4-1, informed of the output document from the print job 5-3, informs the document 5-5-1 of the print sheet document 5-10 constituting the output document.

The document 5-5-1 processes the setting on itself, and assigns other processes to a document processor (image→sheet) 5-9-1 constituting an even smaller work unit. It also informs that the output address is the print sheet document 5-10. The document processor 5-9-1 converts an image document 5-8-1 constituting an input document into the print sheet document 5-10 thereby outputting a sheet.

Then the binder 5-4-1 generates a document 5-5-2 constituting an even smaller work unit and assigns the processes thereto. As the finishing is designated on the job, it so functions as to invalidate the designation of finishing on the document. The binder 5-4-1, being informed of the output document from the print job 5-3, informs the document 5-5-2 of the print sheet document 5-10 constituting the output document.

The document 5-5-2 processes the setting on itself, and assigns other processes to a document processor (image→sheet) 5-9-2 constituting an even smaller work unit. It also informs that the output address is the print sheet document 5-10. The document processor 5-9-2 converts an image document 5-8-2 constituting an input document into the print sheet document 5-10 thereby outputting a sheet.

Then the print job 5-3 generates a binder 5-4-2 and assigns the processes thereto. In this operation, since the finishing is designated on the job, the print job so functions as to invalidate the finishing designation on the binder and the document. Also the print job informs the binder 5-4-2 of the already generated print sheet document 5-10 constituting the output document.

The binder 5-4-2 processes the setting on itself, then generates a document 5-5-3 constituting an even smaller work unit and assigns thereto other processes. In this operation, since the finishing is designated on the job, the binder so works as to invalidate the finishing designation on the document. The binder 5-4-2, being informed of the output document from the print job 5-3, informs the document 5-5-3 of the print sheet document constituting the output document.

The document 5-5-3 processes the setting on itself, and assigns other processes to a document processor (image→sheet) 5-9-3 constituting an even smaller work unit. It also informs that the output address is the print sheet document 5-10 The document processor 5-9-3 converts an image document 5-8-3 constituting an input document into the print sheet document 5-10 thereby outputting a sheet.

Then the binder 5-4-2 generates a document 5-5-4 constituting an even smaller work unit and assigns the processes thereto. As the finishing is designated on the job, it so functions as to invalidate the designation of finishing on the document. The binder 5-4-2, being informed of the output document from the print job 5-3, informs the document 5-5-4 of the print sheet document 5-10 constituting the output document.

The document 5-5-4 processes the setting on itself, and assigns other processes to a document processor (image→sheet) 5-9-4 constituting an even smaller work unit. It also informs that the output address is the print sheet document 5-10. A document processor 5-9-4 converts an image document 5-8-4 constituting an input document into the print sheet document 5-10 thereby outputting a sheet.

It is thus rendered possible to realize an operation of finishing the entire job by correlating the documents included in the job to an output document and finishing such output document.

FIGS. 30A and 30B show an example of the execution process in case a finishing is set on the binder.

As shown in FIG. 30B, the print job 5-3 processes the setting on itself, then generates a binder 5-4-1 constituting a smaller work unit and assigns other processes thereto. The binder 5-4-1, upon detecting the setting of a finishing on itself (binder), generates a print sheet document 5-10-1 constituting an output document. It also processes the setting on itself and generates a document 5-5-1 constituting an even smaller work unit and assigns thereto other processes. In this operation, since the finishing is designated on the binder, the binder so functions as to invalidate the designation of finishing on the document. Also the binder informs the document 5-5-1 of the generated print sheet document 5-10.

The document 5-5-1 processes the setting on itself, and assigns other processes to a document processor (image→sheet) 5-9-1 constituting an even smaller work unit. In this operation, the binder informs that the output address is the print sheet document 5-10-1. The document processor 5-9-1 converts an image document 5-8-1 constituting an input document into the print sheet document 5-10-1, thereby outputting a sheet.

Then the binder 5-4-1 generates a document 5-5-2 constituting an even smaller work unit and assigns the process thereto. As the finishing is designated on itself, it so works as to invalidate the finishing designation on the document. The binder 5-4-1 informs the document 5-5-2 of the print sheet document 5-10 constituting the already generated output document.

The document 5-5-2 processes the setting on itself, and assigns other processes to a document processor (image→sheet) 5-9-2 constituting an even smaller work unit. It also informs that the output address is the print sheet document 5-10. The document processor 5-9-2 converts an image document 5-8-2 constituting an input document into the print sheet document 5-10 thereby outputting a sheet.

Then the print job 5-3 processes the setting on itself, also generates a binder 5-4-2 constituting a smaller work unit and assigns other processes thereto. The binder 5-4-2, upon detecting the setting of a finishing on itself (binder), generates a print sheet document 5-10-2 constituting an output document. It also processes the setting on itself, also generates a document 5-5-3 constituting an even smaller work unit and assigns thereto other processes. In this operation, since the finishing is designated on the binder, the binder so functions as to invalidate the designation of finishing on the document. Also the binder informs the document 5-5-3 of the generated print sheet document 5-10.

The document 5-5-3 processes the setting on itself, and assigns other processes to a document processor (image→sheet) 5-9-3 constituting an even smaller work unit. It also informs that the output address is the print sheet document 5-10. The document processor 5-9-3 converts an image document 5-8-3 constituting an input document into the print sheet document 5-10 thereby outputting a sheet.

Then the binder 5-4-2 generates a document 5-5-4 constituting an even smaller work unit and assigns the processes thereto. As the finishing is designated on the binder, the binder so functions as to invalidate the finishing designation on the document. Also the print sheet document 5-10-2 constituting the already generated output document is informed to the document 5-5-4.

The document 5-5-4 processes the setting on itself, and assigns other processes to a document processor (image→sheet) 5-9-4 constituting an even smaller work unit. It also informs that the output address is the print sheet document 5-10. The document processor 5-9-4 converts an image document 5-8-4 constituting an input document into the print sheet document 5-10 thereby outputting a sheet.

It is thus rendered possible to realize an operation of finishing in the unit of a binder by correlating the documents included in each binder to an output document and finishing such output document.

FIGS. 31A and 31B show an example of the execution process in case a finishing is set on the document. In the present example, the finishing is set on the documents of a binder but not set on those of the other binder (cf. FIG. 31A).

As shown in FIG. 31B, the print job 5-3 processes the setting on itself, then generates a binder 5-4-1 constituting a smaller work unit and assigns other processes thereto. The binder 5-4-1 processes the setting on itself, then generates a document 5-5-1 constituting an even smaller work unit and assigns the processes thereto.

The document 5-5-1 processes the setting on itself, and assigns other processes to a document processor (image→sheet) 5-9-1 constituting an even smaller work unit. In this operation, as the output address is not designated from the upper ranked binder, the document 5-5-1 generates a print sheet document 5-10-1 as the output address regardless of the presence or absence of the designation of the finishing, and informs the document processor 5-9-1 of such output address. The document processor 5-9-1 converts an image document 5-8-1 constituting an input document into the print sheet document 5-10-1, thereby outputting a sheet. In this operation, since the finishing is designated for the document 5-5-1, there is executed finishing on the print sheet document 5-10-1 constituting the output document.

Then the binder 5-4-1 processes the setting on itself, also generates a document 5-5-2 constituting an smaller work unit and assigns the processes thereto. The document 5-5-2 processes the setting on itself, and assigns other processes to a document processor (image→sheet) 5-9-2 constituting an even smaller work unit. As the output address is not designated from the upper ranked binder, the document 5-5-2 generates a print sheet document 5-10-2 as the output address regardless of the presence or absence of the designation of finishing, and informs the document processor 5-9-2 of such output address. The document processor 5-9-2 converts an image document 5-8-2 constituting an input document into the print sheet document 5-10-2, thereby outputting a sheet. In this operation, as the finishing is not designated on the document 5-5-2, the finishing is executed on the print sheet document 5-10-2 constituting the output document.

Then the print job 5-3 processes the setting on itself, also generates a binder 5-4-2 constituting a smaller work unit and assigns other processes thereto. The binder 5-4-2 processes the setting on itself, also generates a document 5-5-3 constituting an even smaller work unit and assigns other processes thereto.

The document 5-5-3 processes the setting on itself, and assigns other processes to a document processor (image→sheet) 5-9-3 constituting an even smaller work unit. In this operation, since the output address is not designated from the upper ranked binder, the document 5-5-3 generates a print sheet document 5-10-3 as the output address regardless of the presence or absence of the designation of finishing, and informs the document processor 5-9-3 of such output address. The document processor 5-9-3 converts a image document 5-8-3 constituting an input document into the print sheet document 5-10-3, thereby outputting a sheet.

Then the binder 5-4-2 processes the setting on itself, also generates a document 5-5-4 constituting an even smaller work unit and assigns the processes thereto. The document 5-5-4 processes the setting on itself, and assigns other processes to a document processor (image→sheet) 5-9-4 constituting an even smaller work unit. As the finishing is not designated from the upper ranked binder, the document 5-5-4 generates a print sheet document 5-10-4 as the output address regardless of the presence or absence of the designation of finishing, and informs the document processor 5-9-4 of such output address. The document processor 5-9-4 converts an image document 5-8-4 constituting an input document into the print sheet document 5-10-4 thereby outputting a sheet.

It is thus rendered possible to realize an operation of finishing in the unit of a document by correlating the documents to an output document and finishing such output document.

The present embodiment not only provides the effects similar to those of the first embodiment but also enables, through various combinations of the setting and the process, detailed setting on the designation of finishing, such as stapled sorting, shift sorting, rotated sorting etc. in outputting plural documents in a job.

The objects of the present invention can naturally be attained also by supplying an information processing system with a memory medium storing program codes of a software realizing the functions of the aforementioned embodiments and by reading and executing the program codes stored in the memory medium by a computer (or a CPU or an MPU) of such system.

In such case, the program codes themselves read from the memory medium realize the novel functions of the present invention, and the memory medium storing such program codes constitutes the present invention.

The memory medium supplying the program codes can be, for example, a floppy disk, a hard disk, an optical disk, a magnetooptical disk, a CD-ROM, a CD-R, a magnetic tape, a non-volatile memory card or a ROM.

Furthermore, the present invention naturally includes not only a case where the functions of the aforementioned embodiments are realized by the computer by executing the read program codes, but also a case where an operating system (OS) or the like functioning on the computer executes all the processes or a part thereof thereby realizing the functions of the aforementioned embodiments.

Furthermore, the present invention naturally includes a case where the program codes read from the memory medium are once stored in a memory provided in a function expansion board inserted into the computer or a function expansion unit connected thereto and a CPU or the like provided in such function expansion board or function expansion unit executes all the processes or a part thereof according to the instruction of such program codes, thereby realizing the functions of the aforementioned embodiments.

As explained in the foregoing, the present invention enables, with little labor and time, setting of the order of output in case of outputting plural documents in a single job or detailed setting on the designation of finishing operation such as stapled sorting, shift sorting or rotated sorting.

What is claimed is:

1. An image forming apparatus for executing various jobs transmitted from an information processing apparatus, the image forming apparatus comprising:
    process analysis means for analyzing a process transmitted from said information processing apparatus;
    job generation means for generating a job according to the analysis of process by said process analysis means;
    job process means including job management means for managing information constituting a job, binder management means for managing information constituting a binder and document management means for managing information constituting a document, and adapted to process the job generated by said job generation means;
    document generation means for dividing the job generated by said job generation means into a smaller document unit thereby generating a document;
    document process means for processing a document generated by said document generation means;
    page generation means for dividing the document generated by said document generation means into a smaller page unit thereby generating a page;
    page process means for processing a page generated by said page generation means;
    band generation means for dividing the page generated by said page generation means into a smaller band unit thereby generating a band;
    band process means for processing a band generated by said band generation means; and
    device use request arbitration means for arbitrating the requests for using a device from said document generation means, said document process means, said page process means and said band process means;
    wherein at least one of said document process means, said page process means and said band process means executes the process according to the formats of input data and output data in said document process means, said page process means and said band process means.

2. An apparatus according to claim 1, wherein said job management means processes a job constituted by at least a binder.

3. An apparatus according to claim 2, wherein said binder management means processes a binder constituted by at least a document.

4. An apparatus according to claim 3, wherein said document management means processes a document constituted by at least a page.

5. An apparatus according to claim 1, wherein said job management means executes process in a book binding mode in case of detecting the book binding mode.

6. An apparatus according to claim 1, wherein said job management means processes the number of output copies and the order of output (collation).

7. An apparatus according to claim 1, wherein said binder management means processes the number of output copies and the order of output (collation).

8. An apparatus according to claim 1, wherein said document management means processes the number of output copies and the order of output (collation).

9. An apparatus according to claim 1, wherein said job management means processes a finishing operation including at least one of stapled sorting, shift sorting and rotated sorting.

10. An apparatus according to claim 1, wherein said binder management means processes a finishing operation including at least one of stapled sorting, shift sorting and rotated sorting.

11. An apparatus according to claim 1, wherein said document management means processes a finishing operation including at least one of stapled sorting, shift sorting and rotated sorting.

12. An apparatus according to claim 1, wherein each of said job management means, said binder management means and said document management means is capable of processing a finishing operation including at least one of stapled sorting, shift sorting and rotated sorting, and management means designated for finishing among said job management means, said binder management means and said document management means generates an output document constituting the output address for said document process means, said page process means or said band process means.

13. An apparatus according to claim 12, wherein, plural management means are designated for finishing, such designation is analyzed in the order of said job management means, said binder management means and said document management means and the designation of finishing is rendered effective only in the management means of the highest rank among the management means designated for finishing, whereby said management means of the highest rank generates said output document while the designation of finishing is rendered ineffective for the management means positioned in the lower ranks than said management means of the highest rank.

14. A control method for an image forming apparatus for executing various jobs transmitted from an information processing apparatus, the method comprising:
- a process analysis step of analyzing a process transmitted from said information processing apparatus;
- a job generation step of generating a job according to the analysis of process by said process analysis step;
- a job process means including a job management step of managing information constituting a job, a binder management step of managing information constituting a binder and a document management step of managing information constituting a document, and adapted to process the job generated by said job generation step;
- a document generation step of dividing the job generated by said job generation step into a smaller document unit thereby generating a document;
- a document process step of processing a document generated by said document generation step into a smaller page unit thereby generating a page;
- a page process step of processing a page generated by said page generation step;
- a band generation step of dividing the page generated by said page generation step into a smaller band unit thereby generating a band;
- a band process step of processing a band generated by said band generation step; and
- a device use request arbitration step of arbitrating the requests for using a device from said document generation step, said document process step, said page process step and said band process step;
- wherein at least one of said document process step, said page process step and said band process step executes the process according to the formats of input data and output data in said document process step, said page process step and said band process step.

15. A computer program to be executed by a computer of an image forming apparatus for executing various jobs transmitted from an information processing apparatus, the computer program being embodied in a computer readable medium for performing steps comprising:
- a process analysis step of analyzing a process transmitted from said information processing apparatus;
- a job generation step of generating a job according to the analysis of process by said process analysis step;
- a process means including a job management step of managing information constituting a job, a binder management step of managing information constituting a binder and a document management step of managing information constituting a document, and adapted to process the job generated by said job generation step;
- a document generation step of dividing the job generated by said job generation step into a smaller document unit thereby generating a document;
- a document process step of processing a document generated by said document generation step;
- a page generation step of dividing the document generated by said document generation step into a smaller page unit thereby generating a page;
- a page process step of processing a page generated by said page generation step;
- a band generation step of dividing the page generated by said page generation step into a smaller band unit thereby generating a band;
- a code of a band process step of processing a band generated by said band generation step; and
- a device use request arbitration step of arbitrating the requests for using a device from said document generation step, said document process step, said page process step and said band process step;
- wherein at least one of said document process step, said page process step and said band process step executes the process according to the formats of input data and output data in said document process step, said page process step and said band process step.

16. An image forming apparatus capable of communicating with an information processing apparatus, comprising:
- reception means for receiving process information from said information processing apparatus;
- job generation means for generating a job based on the process information received by said reception means;
- binder generation means for generating plural binders based the job generated by said job generation means;
- document generation means for generating plural documents based on the binder generated by said binder generation means;
- determination means for determining a device to be used, among plural devices provided in said image forming apparatus, based on the process information received by said reception means;
- assignment means for assigning the document generated by said document generation means to the device determined by said determination means;
- page generation means for generating plural pages based on the document generated by said document generation means; and
- band generation means for generating plural bands based on the page generated by said page generation means;
- wherein said assignment means assigns the page generated by said page generation means and the band generated by said band generation means to the device determined by said determination means.

17. A control method for an image forming apparatus capable of communicating with an information processing apparatus, the method comprising:
- a reception step of receiving process information from said information processing apparatus;
- a job generation step of generating a job based on the process information received by said reception step;
- a binder generation step of generating plural binders based the job generated by said job generation step;
- a document generation step of generating plural documents based on the binder generated by said binder generation step;
- a determination step of determining a device to be used, among plural device provided in said image forming apparatus, based on the process information received by said reception step;
- an assignment step of assigning the document generated by said document generation step to the device determined by said determination step;
- a page generation step of generating plural pages based on the document generated in said document generation step; and
- a band generation step of generating plural bands based on the page generated in said generating step,
- wherein the page generated in said page generation step and band generated in said band generation step are assigned in said assignment step to the device determined in said determining step.

18. A computer program to be executed by a computer of an image forming apparatus capable of communicating with an information processing apparatus, the computer program being embodied in a computer readable medium for performing steps comprising:
- a reception step of receiving process information from said information processing apparatus;
- a job generation step of generating a job based on the process information received by said reception step;

a binder generation step of generating plural binders based the job generated by said job generation step;

a document generation step of generating plural documents based on the binder generated by said binder generation step;

a determination step of determining a device to be used, among plural device provided in said image forming apparatus, based on the process information received by said reception step;

an assignment step of assigning the document generated by said document generation step to the device determined by said determination step;

a page generating step of generating plural pages based on the document generated in said document generation step; and a band generation step of generating plural bands based on the page generated in said generating step, wherein the page generated in said page generation step and band generated in said band generation step are assigned in said assignment step to the device determined in said determining step.

19. A computer readable memory medium storing a computer program for performing steps comprising:

a reception step of receiving process information from said information processing apparatus;

a job generation step of generating a job based on the process information received by said reception step;

a binder generation step of generating plural binders based the job generated by said job generation step;

a document generation step of generating plural documents based on the binder generated by said binder generation step;

a determination step of determining a device to be used, among plural device provided in said image forming apparatus, based on the process information received by said reception step;

an assignment step of assigning the document generated by said document generation step to the device determined by said determination step;

a page generating of generating plural pages based on the document generated on the document generated in said document generation step; and a band generation step of generating plural bands based on the page generated in said generating step, wherein the page generated in said page generation step and band generated in said band generation step are assigned in said assignment step to the device determined in said determining step.

* * * * *

UNITED STATES PATENT AND TRADEMARK OFFICE
CERTIFICATE OF CORRECTION

PATENT NO.    : 6,972,855 B2
DATED         : December 6, 2005
INVENTOR(S)   : Masaki Kashiwagi It is certified that error appears in the above-identified patent and that said Letters Patent is hereby corrected as shown below:

<u>Title page,</u>
Item [57], ABSTRACT,
Line 11, "generated" should read -- generate --.

<u>Column 1,</u>
Line 32, "through" should read -- though --.
Line 33, "but" should be deleted.

<u>Column 3,</u>
Line 1, "interfaced" should read -- interface --.

<u>Column 5,</u>
Line 1, "there" should read -- it --.

<u>Column 17,</u>
Line 17, "1" should read -- 1, --.

<u>Column 18,</u>
Line 9, "28B =are" should read -- 28 are --.
Line 36, "raned" should read -- ranked --.

<u>Column 25,</u>
Line 44, "process" should read -- job process --.

<u>Column 26,</u>
Lines 12 and 39, "based" should read -- based on --.
Line 44, "device" should read -- devices --.

<u>Column 27,</u>
Line 2, "based" should read -- based on --.
Line 6, "device" should read -- devices --.

UNITED STATES PATENT AND TRADEMARK OFFICE
CERTIFICATE OF CORRECTION

PATENT NO. : 6,972,855 B2
DATED : December 6, 2005
INVENTOR(S) : Masaki Kashiwagi It is certified that error appears in the above-identified patent and that said Letters Patent is hereby corrected as shown below:

<u>Column 28,</u>
Line 4, "based" should read -- based on --.
Line 8, "device" should read -- devices --.
Line 14, "generating" (1st occurrence) should read -- generating step --.
Line 18, "generating" should read -- page generating --.
Line 19, "generation" should read -- generating --.

Signed and Sealed this

Sixteenth Day of May, 2006

JON W. DUDAS
*Director of the United States Patent and Trademark Office*